United States Patent
Jeong et al.

(10) Patent No.: US 11,758,221 B2
(45) Date of Patent: Sep. 12, 2023

(54) WIRELESS COMMUNICATION CONNECTION SYSTEM INCLUDING MOBILE TERMINAL AND ELECTRONIC DEVICE TO PERFORM WIRELESS COMMUNICATION CONNECTION THROUGH MOBILE TERMINAL

(71) Applicant: LG ELECTRONICS INC., Seoul (KR)

(72) Inventors: Hyojeong Jeong, Seoul (KR); Taejin Park, Seoul (KR); Chiho Shin, Seoul (KR); Chanseok Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/292,259

(22) PCT Filed: Dec. 31, 2018

(86) PCT No.: PCT/KR2018/016950
§ 371 (c)(1),
(2) Date: May 7, 2021

(87) PCT Pub. No.: WO2020/141616
PCT Pub. Date: Jul. 9, 2020

(65) Prior Publication Data
US 2021/0385526 A1 Dec. 9, 2021

(51) Int. Cl.
*H04N 21/4367* (2011.01)
*H04W 4/80* (2018.01)
(Continued)

(52) U.S. Cl.
CPC ... *H04N 21/4367* (2013.01); *H04N 21/41407* (2013.01); *H04N 21/4222* (2013.01);
(Continued)

(58) Field of Classification Search
CPC ......... H04N 21/4367; H04N 21/41407; H04N 21/4222; H04N 21/4753; H04N 21/42209;
(Continued)

(56) References Cited

U.S. PATENT DOCUMENTS

2012/0213134 A1* 8/2012 Woo .................. H02J 7/025
370/311
2013/0176502 A1* 7/2013 Nagata .............. H04N 21/4782
348/725

(Continued)

FOREIGN PATENT DOCUMENTS

JP 2013258672 12/2013
KR 1020140001497 1/2014
(Continued)

OTHER PUBLICATIONS

PCT International Application No. PCT/KR2018/016950, International Search Report dated Sep. 26, 2019, 2 pages.
(Continued)

*Primary Examiner* — Oschta I Montoya
(74) *Attorney, Agent, or Firm* — LEE, HONG, DEGERMAN, KANG & WAIMEY PC

(57) ABSTRACT

A wireless communication connection system enables an electronic device to perform Wi-Fi connection using a mobile terminal and to facilitate liking to the mobile terminal. The wireless communication connection system includes a mobile terminal connected to a wireless communication network, and an electronic device to perform, when receiving wireless communication connection information from the mobile terminal, the wireless communication connection based on the received wireless communication connection information. The electronic device displays an authentication manner, receives the wireless communication connection information from the mobile terminal when the (Continued)

mobile terminal is authenticated in the authentication manner, and is connected to a wireless communication network the same as the wireless communication network connected to the mobile terminal.

14 Claims, 19 Drawing Sheets

(51) Int. Cl.
  *H04N 21/414* (2011.01)
  *H04N 21/422* (2011.01)
  *H04N 21/475* (2011.01)
(52) U.S. Cl.
  CPC ... *H04N 21/42209* (2013.01); *H04N 21/4753* (2013.01); *H04W 4/80* (2018.02)
(58) Field of Classification Search
  CPC ............ H04N 21/485; H04N 21/4131; H04N 21/43615; H04W 4/80; H04W 84/12; H04W 12/06; H04W 12/37; G06F 21/35; G06F 2221/2133
  See application file for complete search history.

(56) References Cited

U.S. PATENT DOCUMENTS

| | | | |
|---|---|---|---|
| 2013/0179925 A1* | 7/2013 | Woods | H04N 21/4222 725/51 |
| 2015/0100618 A1* | 4/2015 | Le Guen | H04L 65/1036 709/201 |
| 2015/0296251 A1 | 10/2015 | Xu et al. | |
| 2015/0358656 A1 | 12/2015 | Matsumura et al. | |
| 2016/0149901 A1 | 5/2016 | Liu et al. | |
| 2018/0270442 A1* | 9/2018 | Park | H04M 1/72412 |
| 2018/0288660 A1* | 10/2018 | Honda | H04W 36/0038 |
| 2020/0204673 A1* | 6/2020 | Barathan | H04W 4/70 |
| 2020/0221150 A1* | 7/2020 | Guo | H04N 21/8352 |
| 2021/0092167 A1* | 3/2021 | Lugiai | H04L 41/06 |

FOREIGN PATENT DOCUMENTS

| | | |
|---|---|---|
| KR | 101395444 | 5/2014 |
| WO | 2014137819 | 9/2014 |

OTHER PUBLICATIONS

European Patent Office Application Serial No. 18945368.1, Search Report dated Jul. 19, 2022, 9 pages.

* cited by examiner

[Fig. 1]
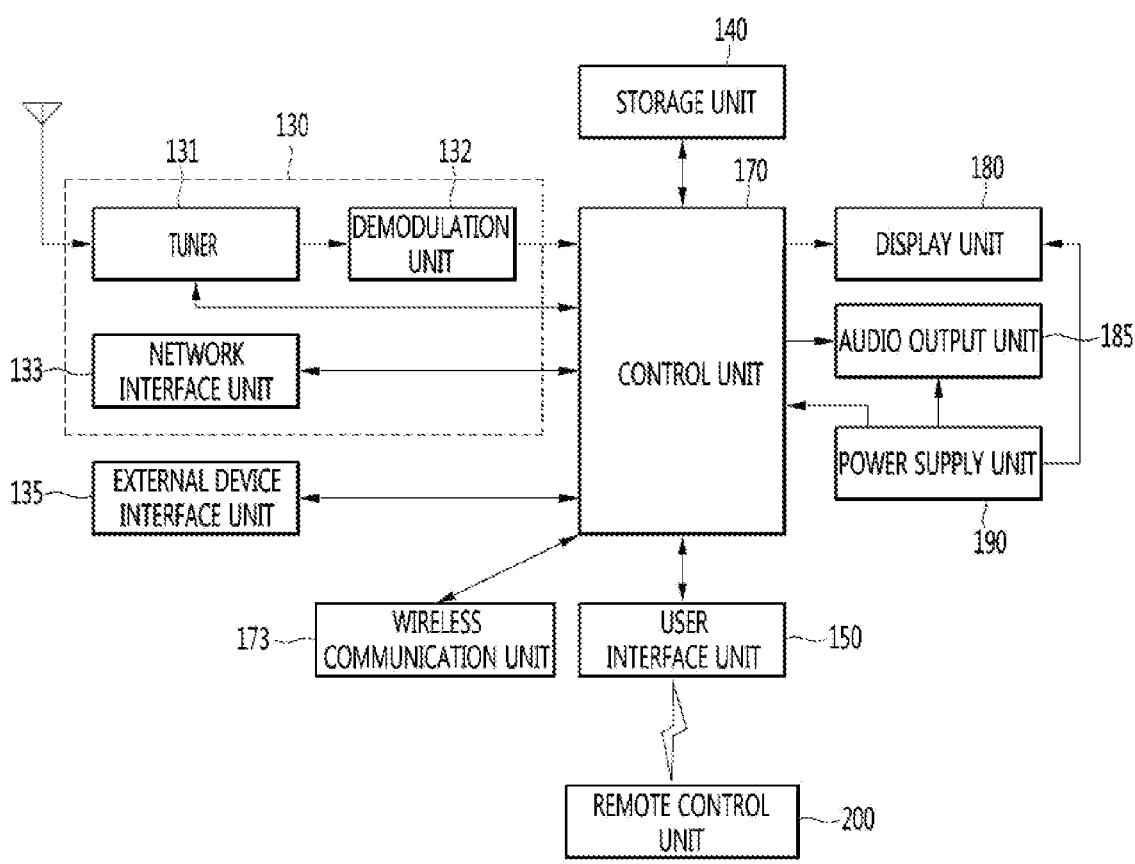

【Fig. 2】
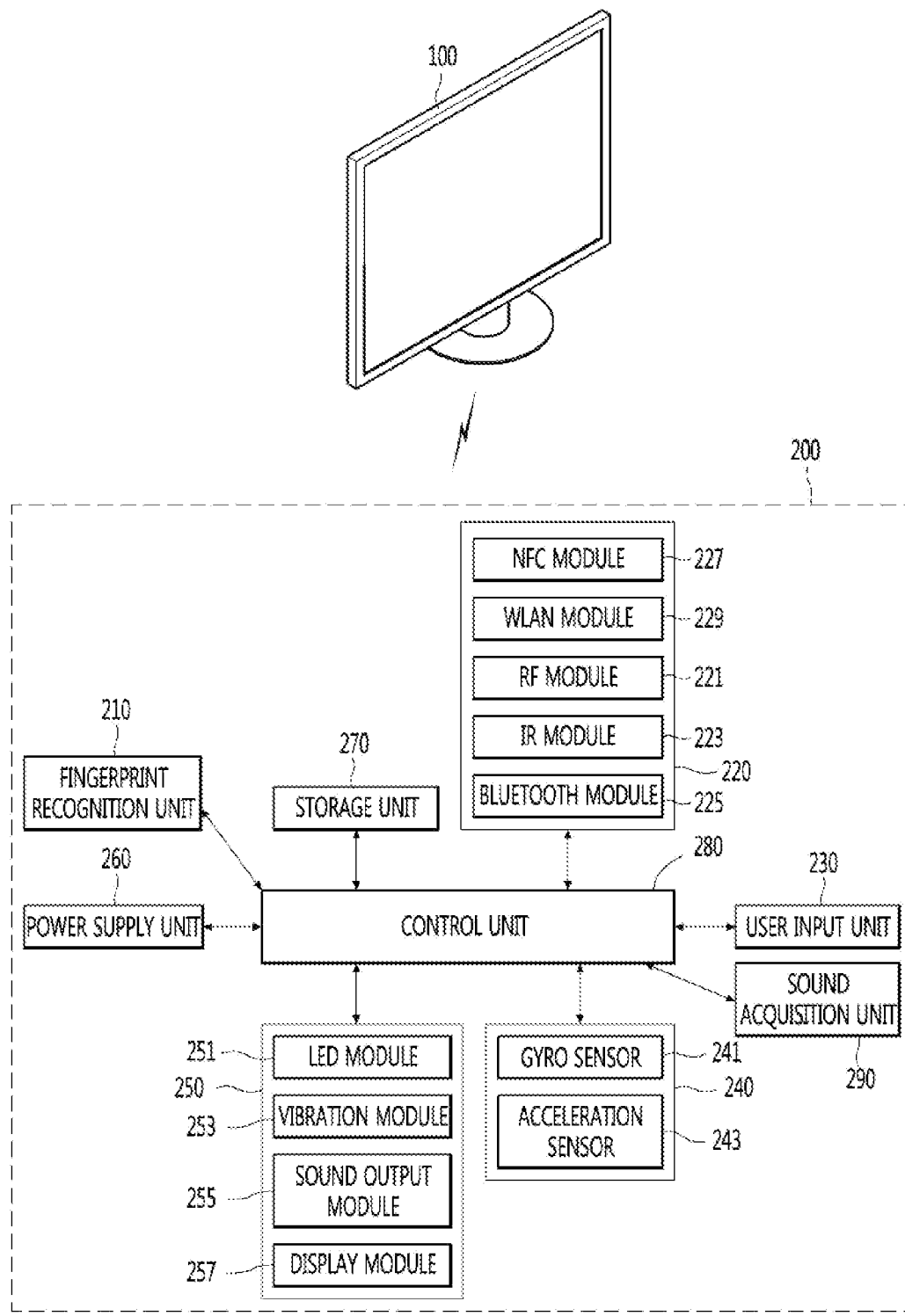

【Fig. 3】
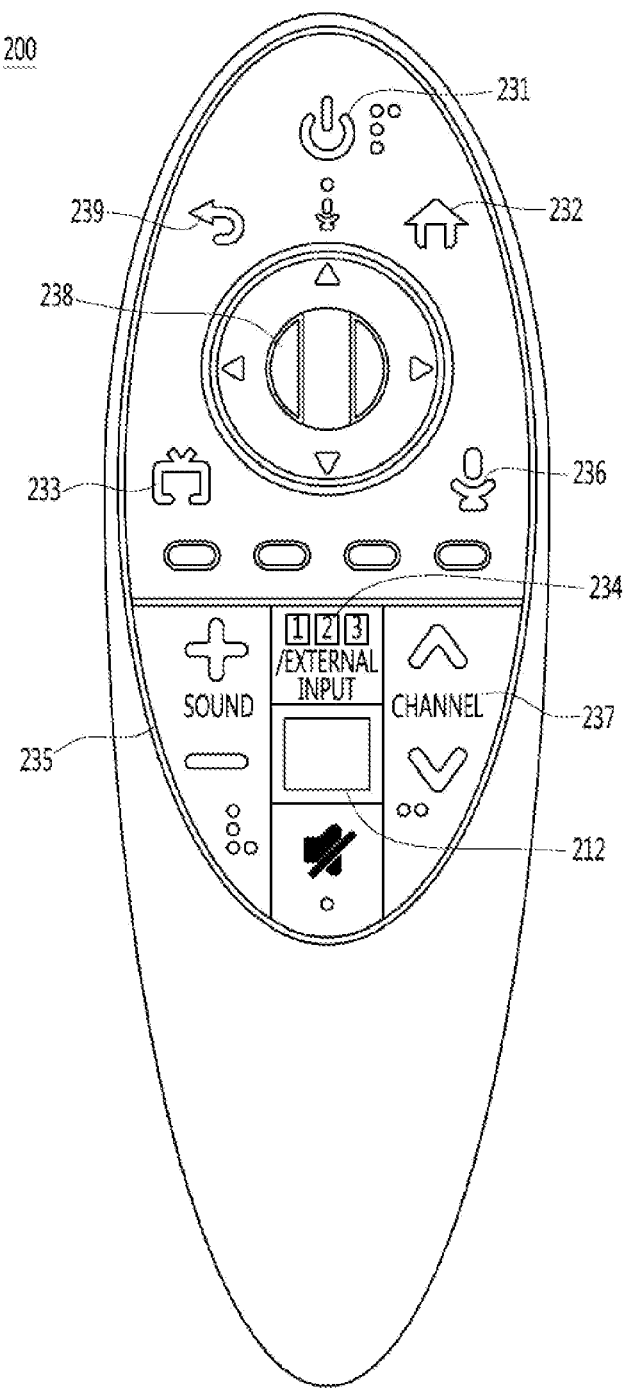

[Fig. 4]
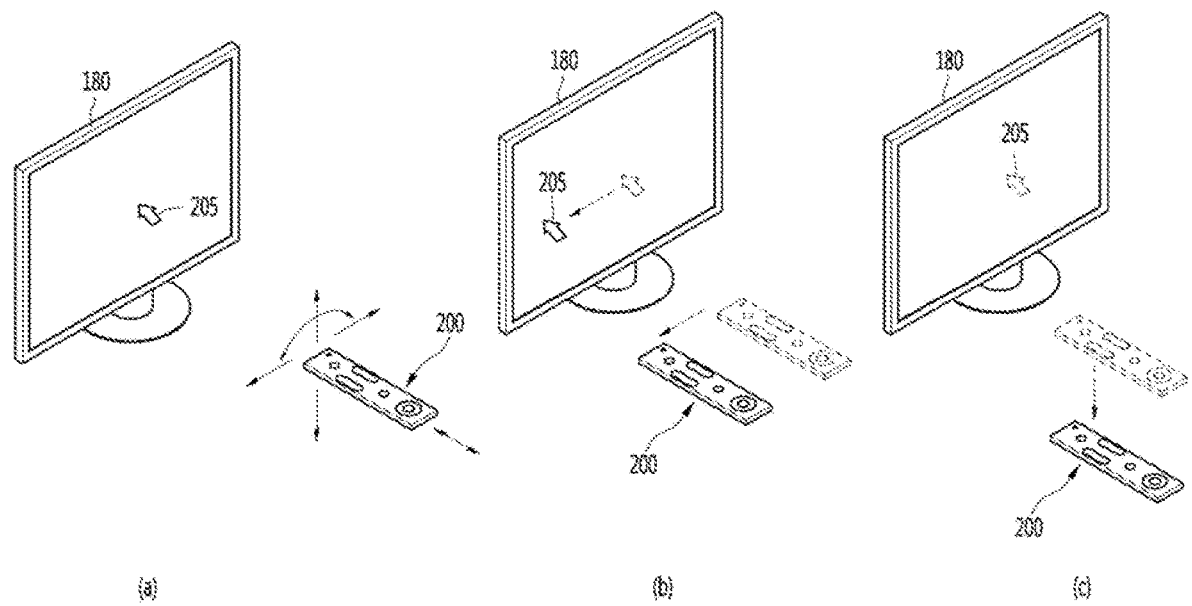

[Fig. 5]
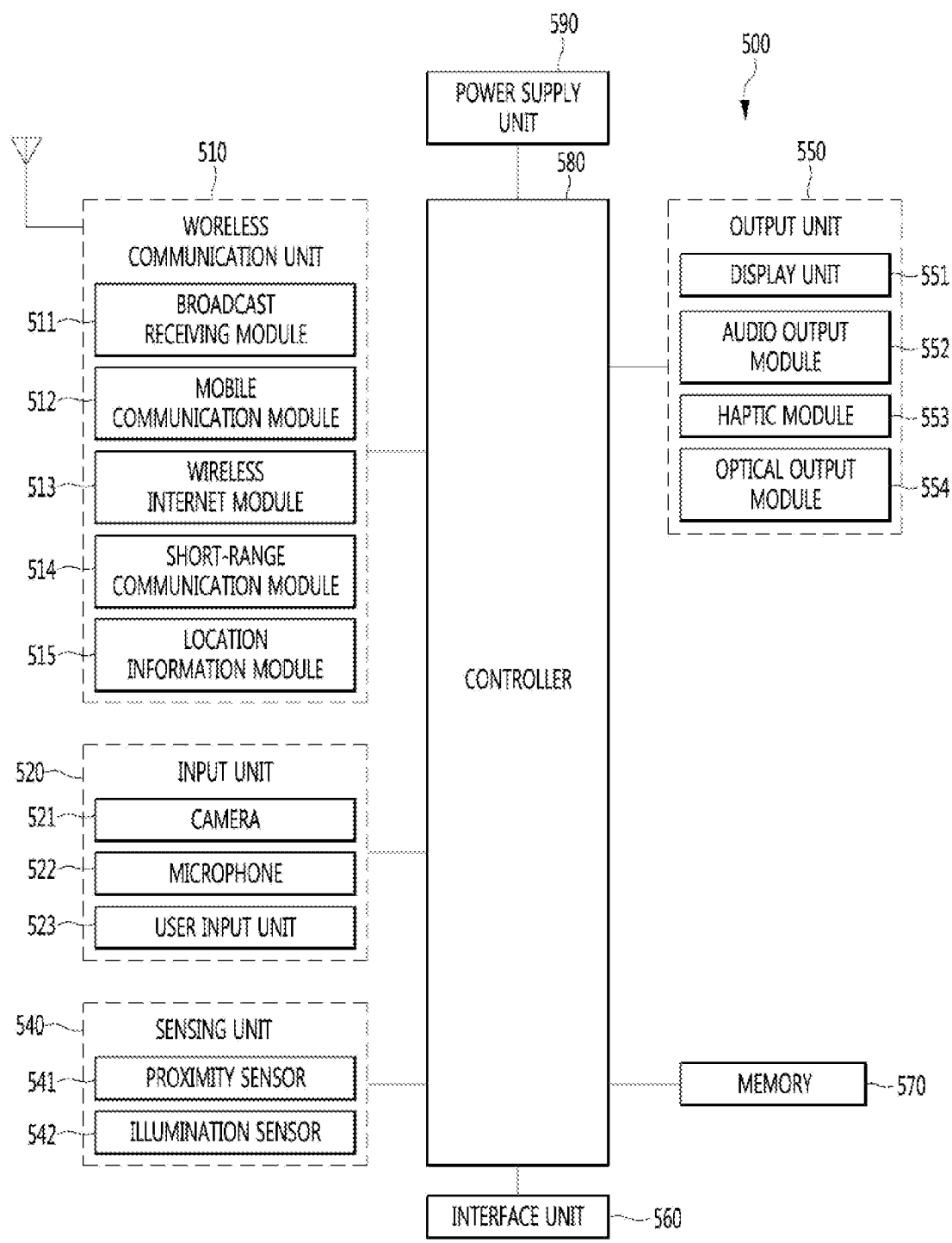

[Fig. 6]
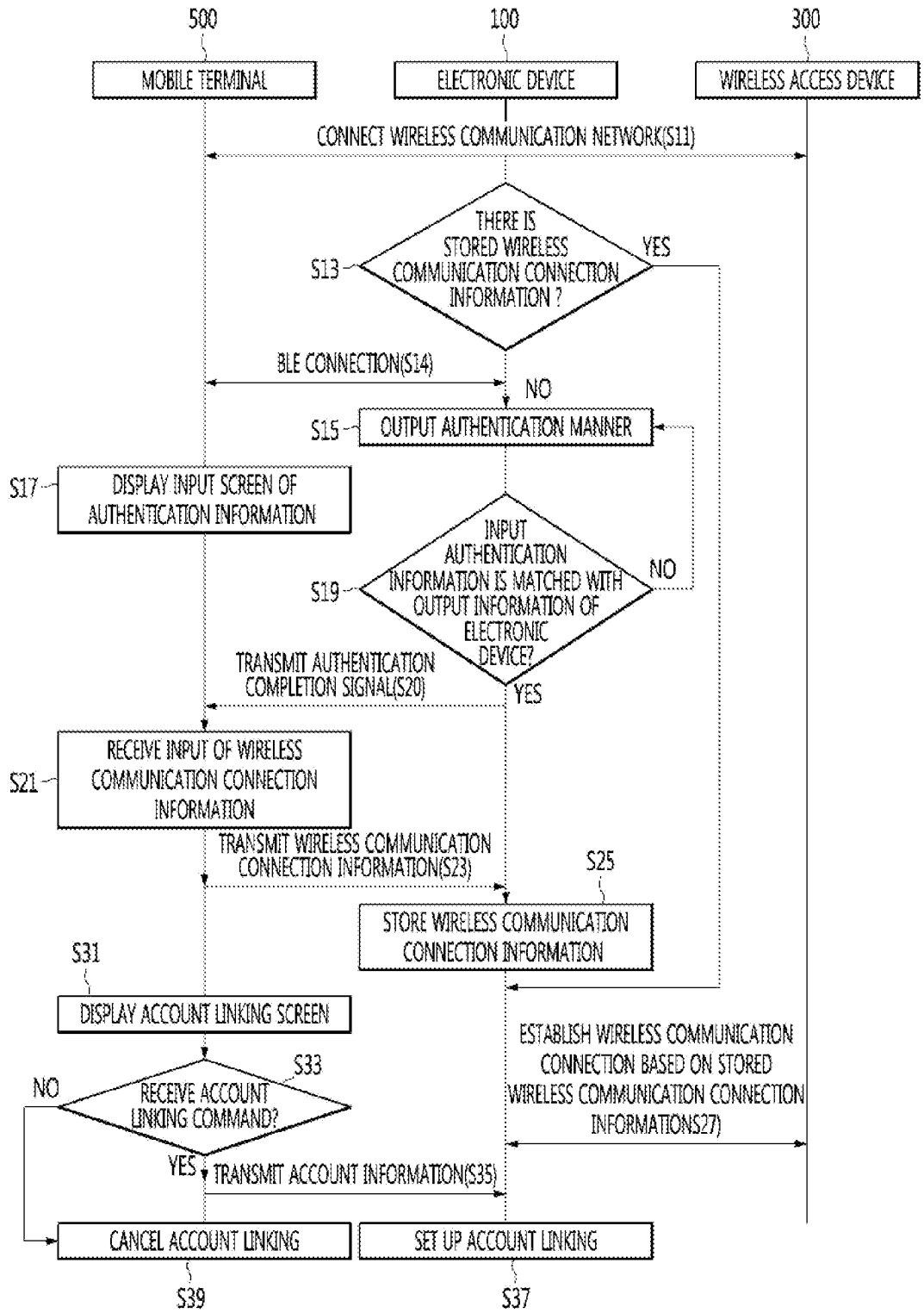

[Fig. 7]
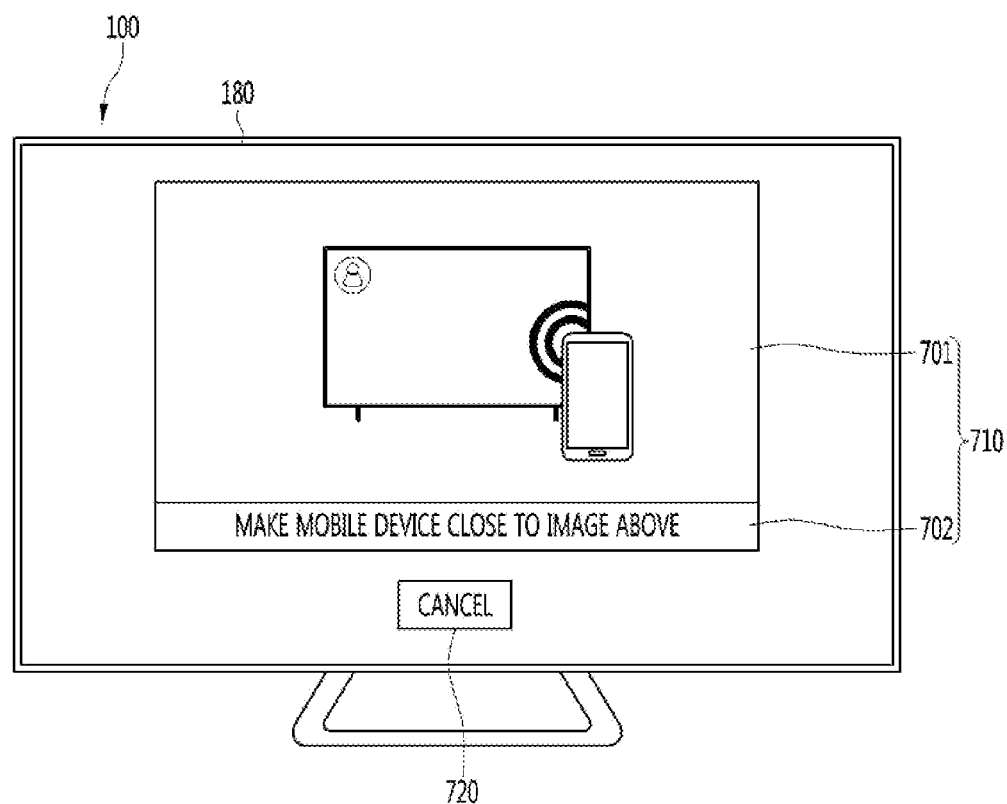

[Fig. 8]
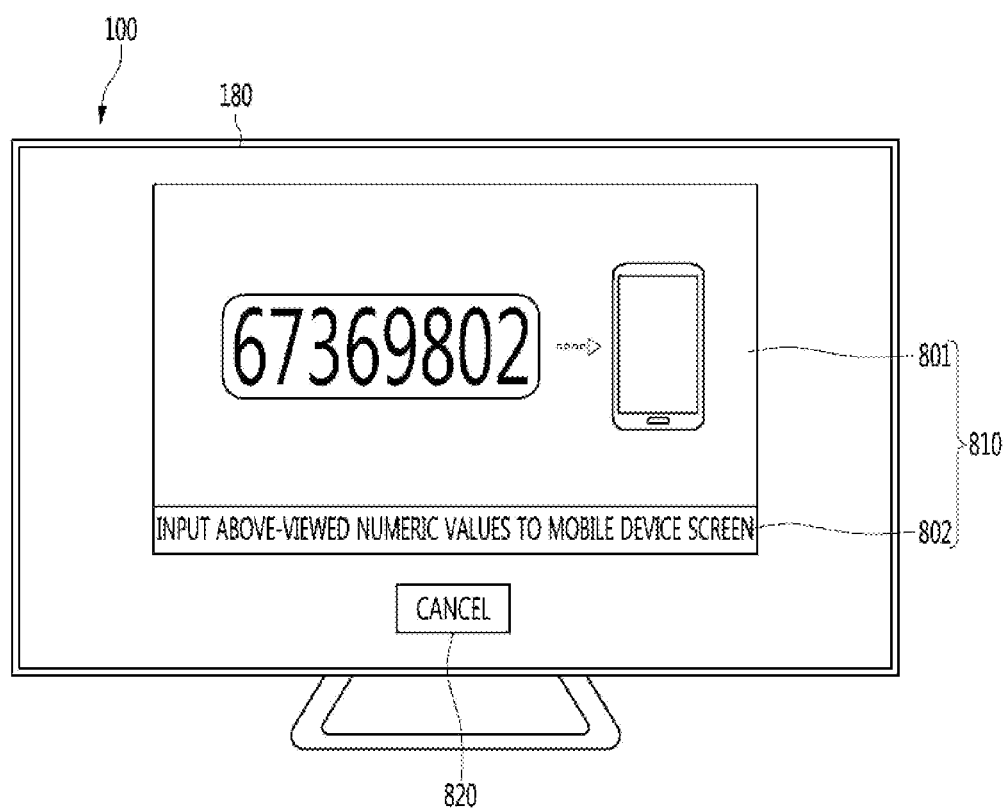

[Fig. 9]
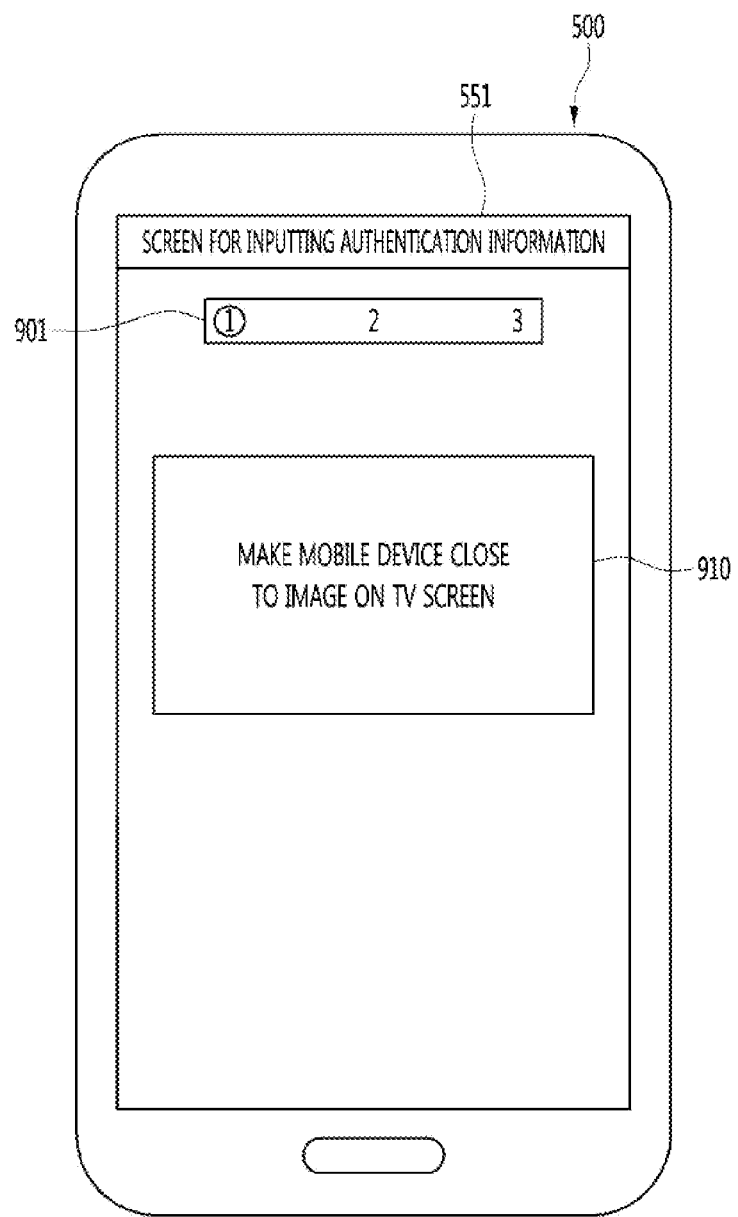

[Fig. 10]
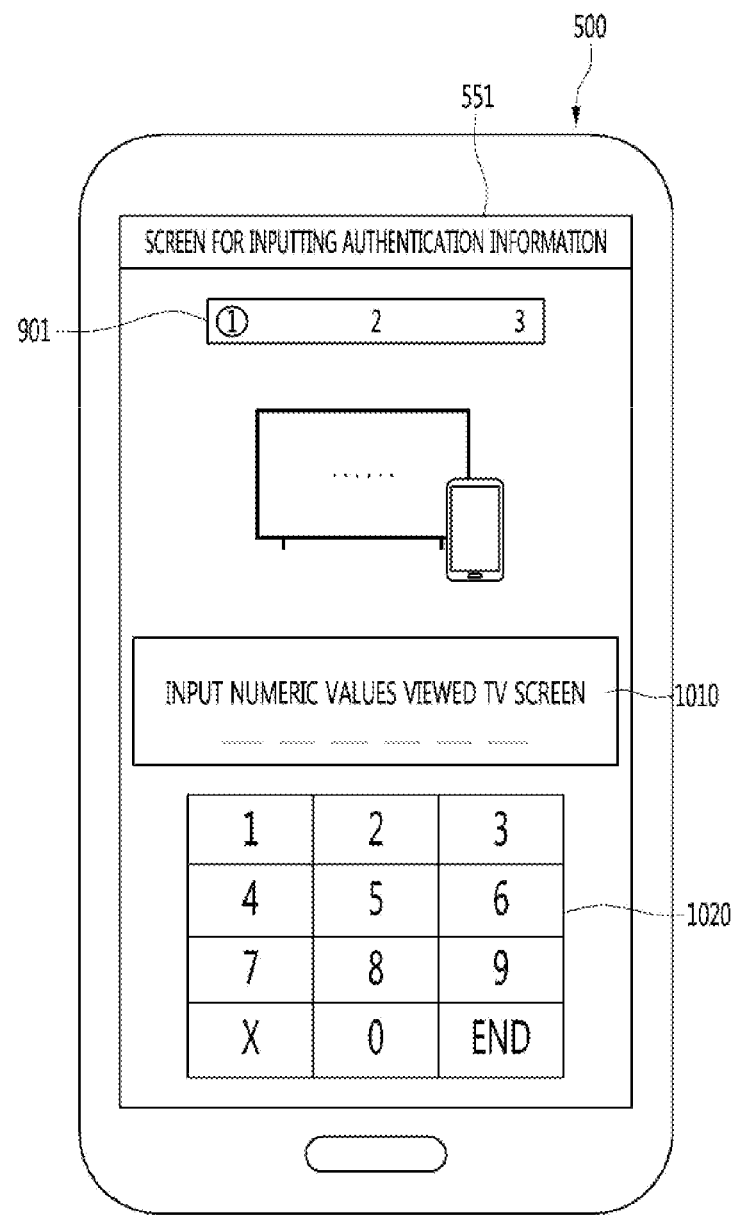

[Fig. 11]
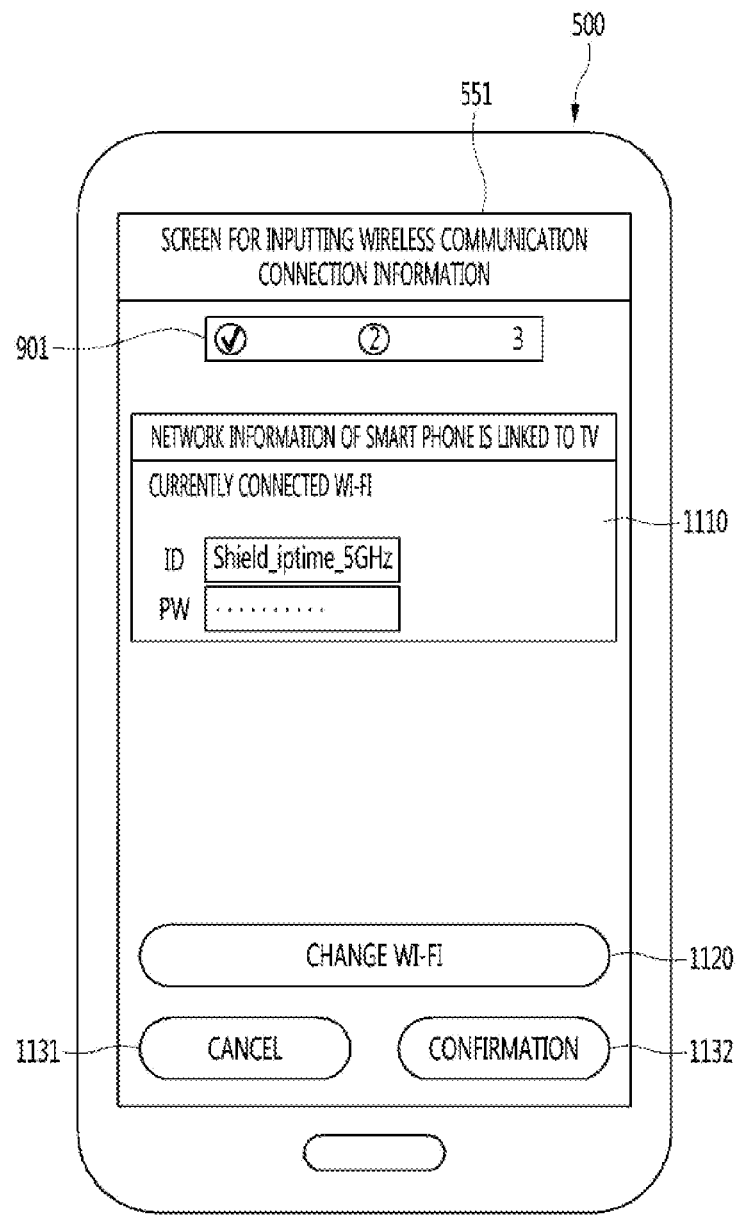

[Fig. 12]
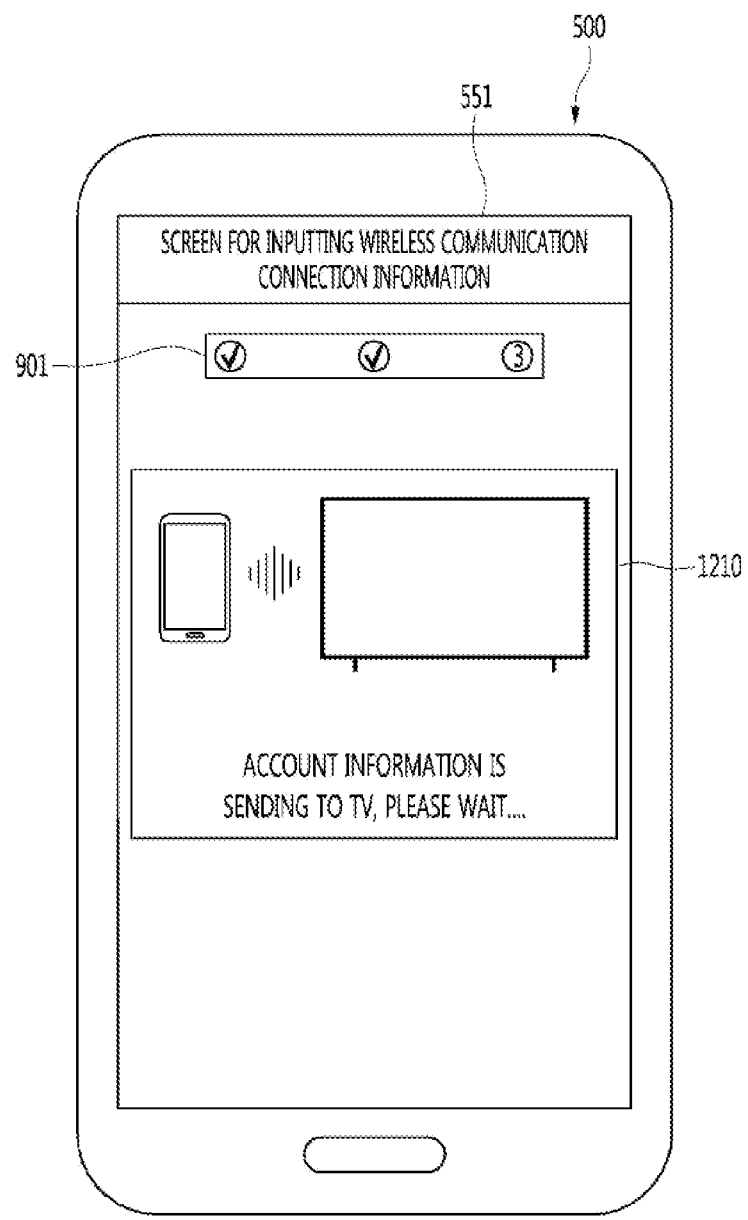

[Fig. 13]
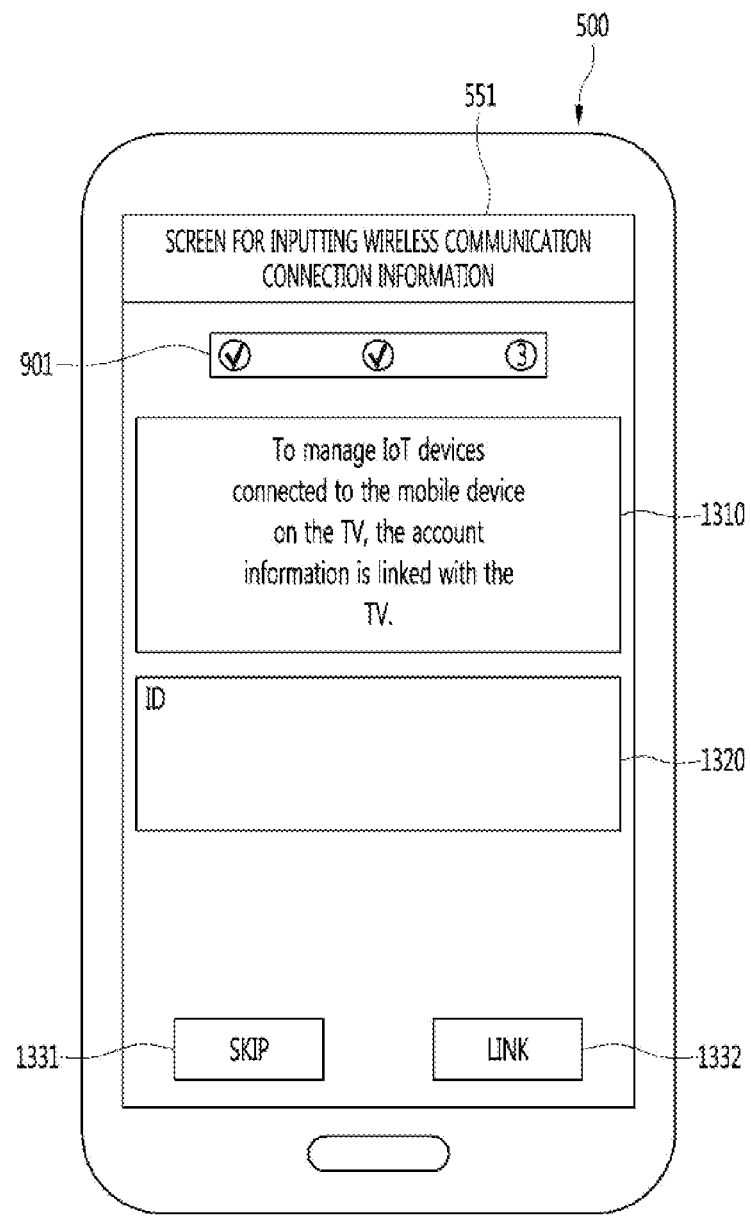

[Fig. 14]
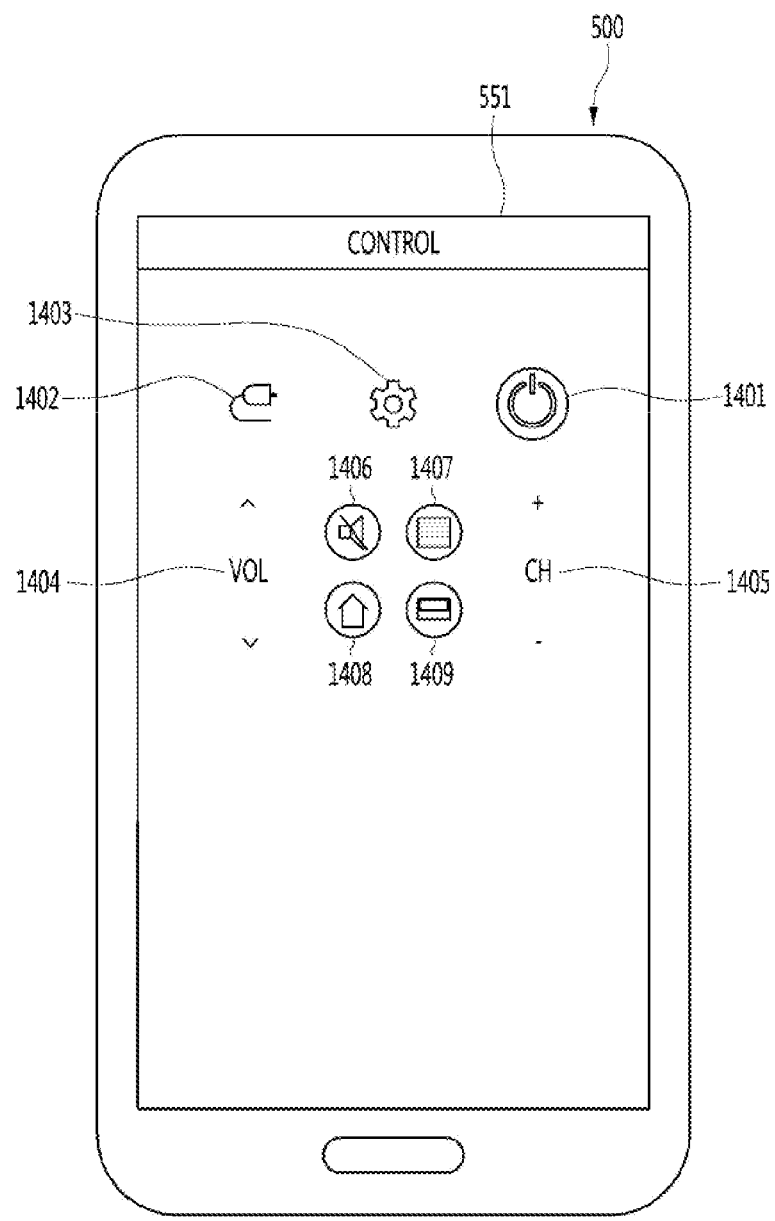

[Fig. 15]
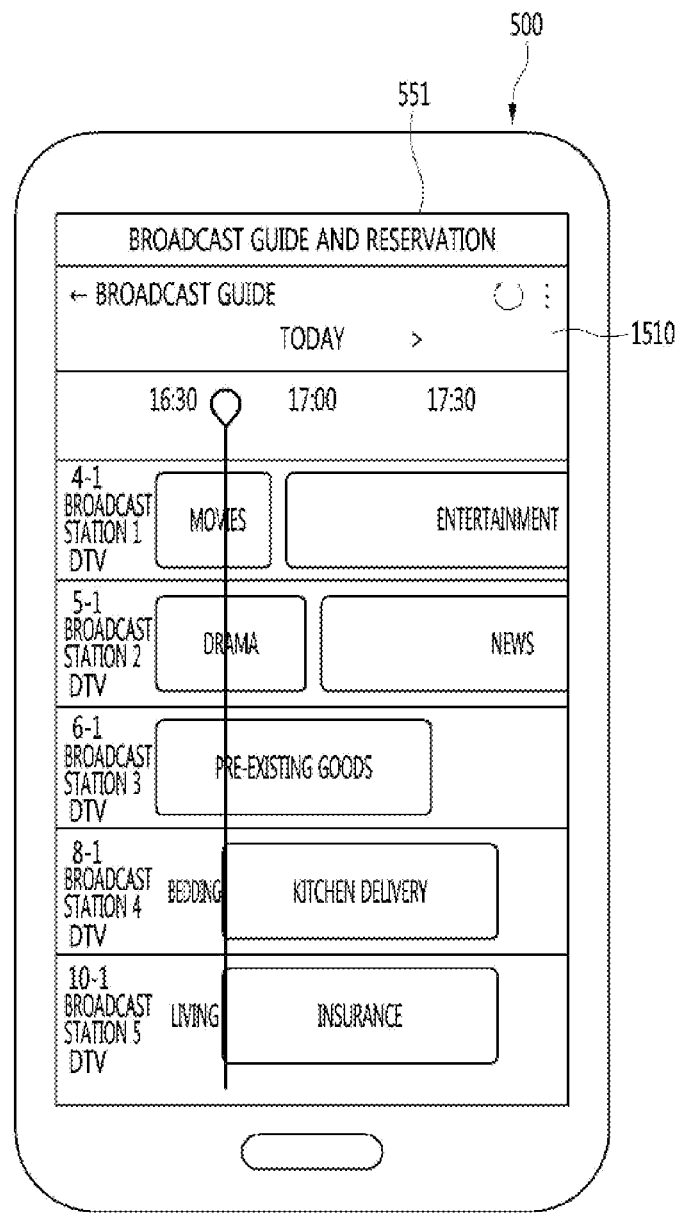

[Fig. 16]
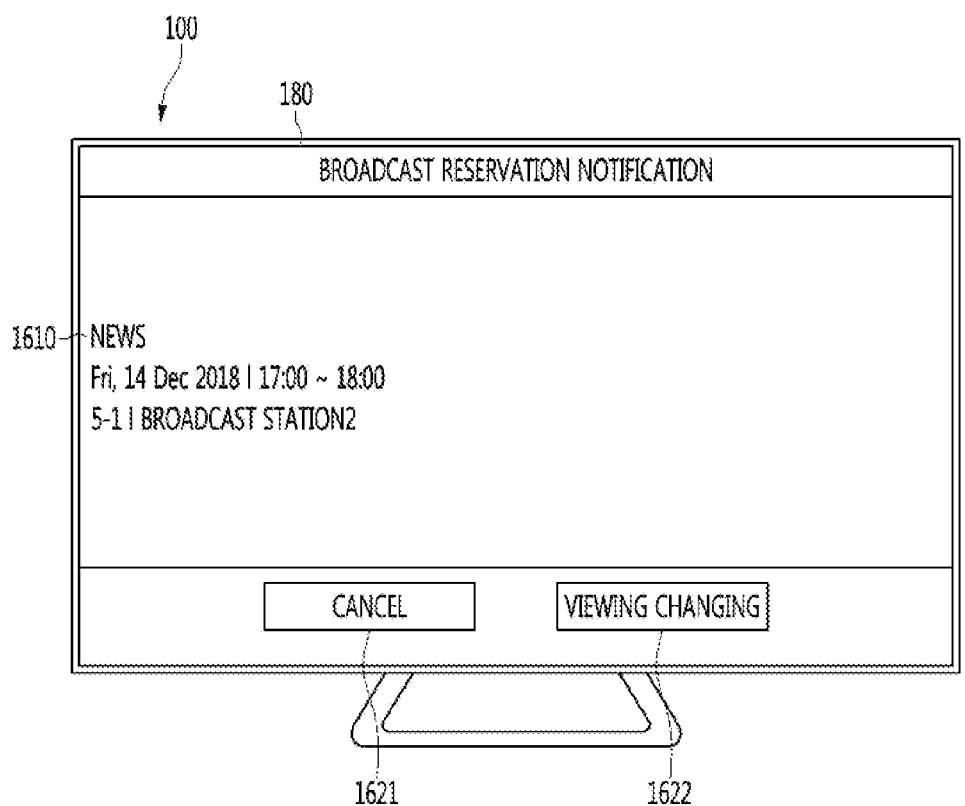

[Fig. 17]
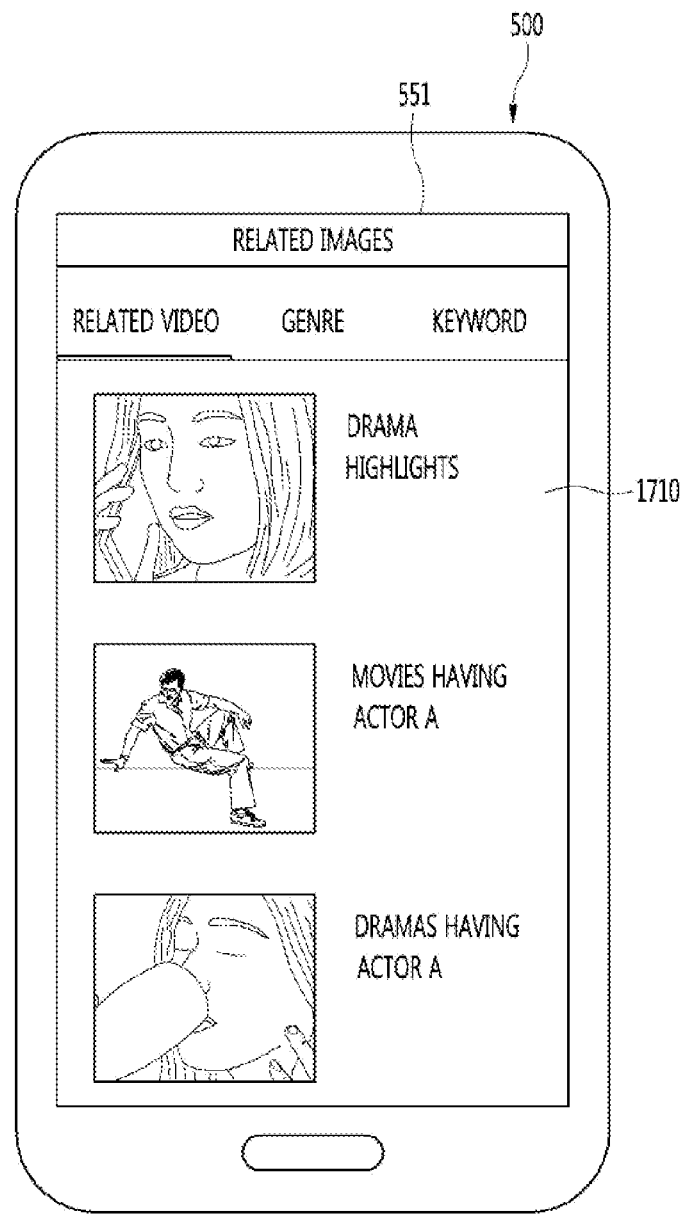

[Fig. 18]
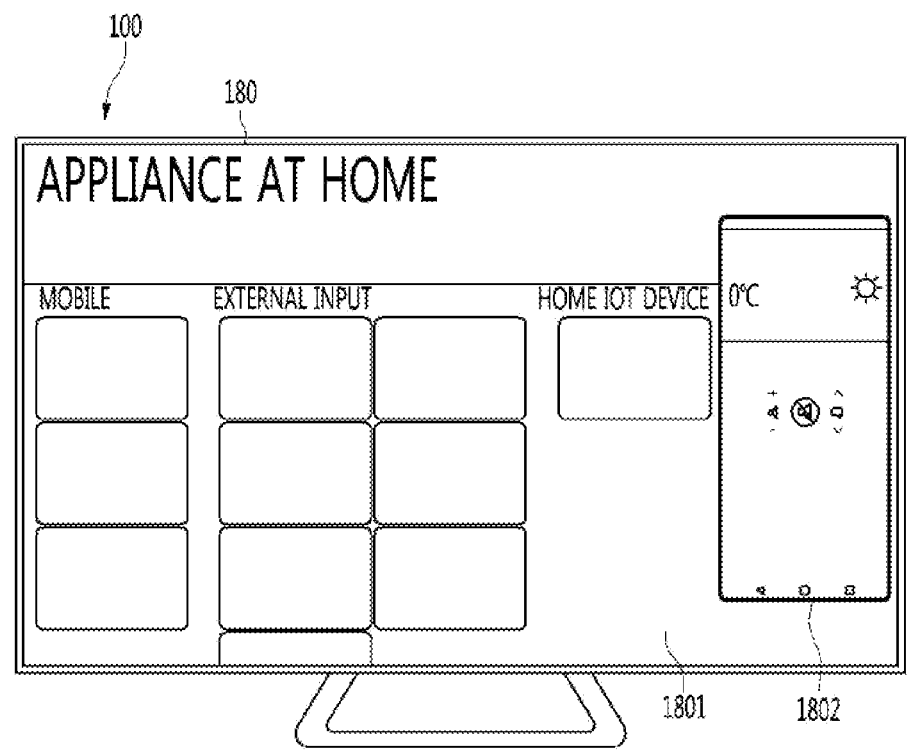
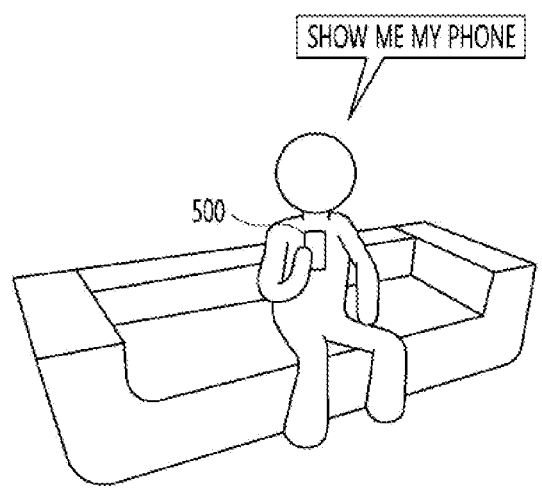

[Fig. 19]
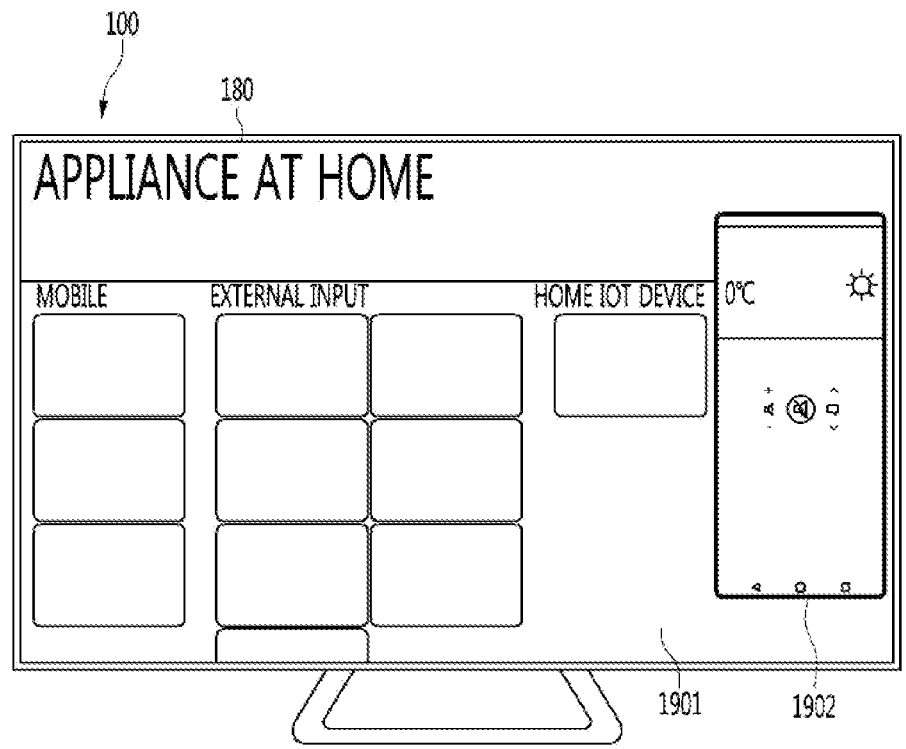
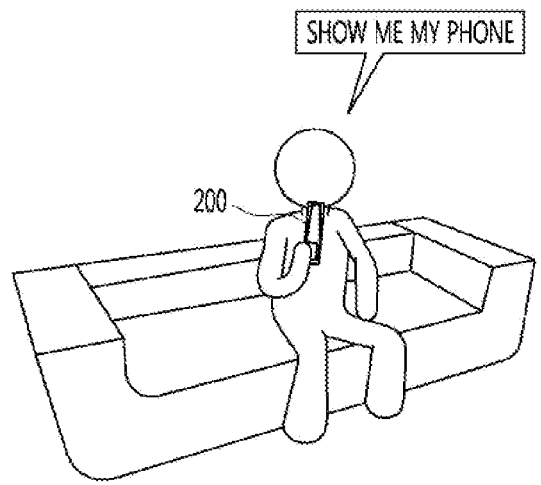

WIRELESS COMMUNICATION CONNECTION SYSTEM INCLUDING MOBILE TERMINAL AND ELECTRONIC DEVICE TO PERFORM WIRELESS COMMUNICATION CONNECTION THROUGH MOBILE TERMINAL

CROSS-REFERENCE TO RELATED APPLICATIONS

This application is the National Stage filing under 35 U.S.C. 371 of International Application No. PCT/KR2018/016950, filed on Dec. 31, 2018, the contents of which are hereby incorporated by reference herein its entirety.

TECHNICAL FIELD

The present disclosure relates to a wireless communication connection system including a mobile terminal and an electronic device to perform wireless communication connection through the mobile terminal.

BACKGROUND ART

Wireless communications, which is a technology for transmitting information to a remote place using radio waves, does not require the connection by a line, so the use of the wireless communication is increased.

Wireless communication can be classified into long-distance wireless communication and short-range wireless communication depending on distances at which information may be transmitted. There are present various technologies supporting short-range wireless communication, including ZigBee, Bluetooth, low-Low energy (BLE), wireless fidelity, and near field communication (NFC).

Meanwhile, recently, with the development of Internet of Things (Iot) technologies, the development of the short-range wireless communication technology has continued to transmit information between devices.

Especially, in the case of Wi-Fi, as an electronic device receives Wi-Fi connection information from a mobile terminal, such as a smart phone, instead of directly receiving the Wi-Fi connection information, a Wi-Fi technology based on a device provisioning protocol (DPP) allowing the Wi-Fi connection has been developed.

Wi-Fi Alliance Device Provisioning Protocol (WFA DPP) may facilitate the Wi-Fi connection of an electronic device, especially, the Wi-Fi connection of an electronic device having no, especially, a display module.

DISCLOSURE

Technical Problem

The present invention provides a user interface (UI) and a user experience (UX) for Wi-Fi connection based on the DPP.

Technical Solution

A system for wireless communication connection according to an embodiment of the present invention comprising a mobile terminal connected to a wireless communication network, and an electronic device to perform, when receiving wireless communication connection information from the mobile terminal, the wireless communication connection based on the received wireless communication connection information, wherein the electronic device displays an authentication manner, receives the wireless communication connection information from the mobile terminal when the mobile terminal is authenticated in the authentication manner, and is connected to a wireless communication network the same as the wireless communication network connected to the mobile terminal.

The electronic device displays an authentication number when displaying the authentication manner, and authenticates the mobile terminal when an input number received from the mobile terminal is matched with the authentication number.

The electronic device displays an image representing a setting area when displaying the authentication manner, and authenticate the mobile terminal when the mobile terminal is sensed in the setting area.

The electron device makes Bluetooth Low Energy (BLE) communication with the mobile terminal before connected to the wireless communication network connected to the mobile terminal, and makes Wi-Fi communication with the mobile terminal after connected to the wireless communication network connected to the mobile terminal.

The electronic device makes Bluetooth Low Energy (BLE) communication with the mobile terminal in a power-off state after connected to the wireless communication network connected to the mobile terminal.

The mobile terminal changes the wireless communication network, which is currently connected, when receiving a command for changing the wireless communication network to another wireless communication network, and transmits, to the electronic device, wireless communication connection information based on the another wireless communication network.

The mobile terminal displays an electronic program guide (EPG) screen when receiving a command for displaying an EPG while the electronic device is displaying an image.

The mobile terminal receives a broadcast reservation command through the EPG screen, and wherein the electronic device displays a broadcast reservation notification screen based on the broadcast reservation command.

The mobile terminal displays an image related to an image displayed by the electronic device when receiving a command for displaying the related image while the electronic device is displaying the image.

The electronic device displays a mirrored image including a screen of the mobile terminal when receiving a mirroring command through a remote control.

The mobile terminal sets account linking by transmitting account information, which is registered, to the electronic device.

The mobile terminal includes a wireless Internet module to support Wi-Fi communication provided by a wireless access device, a display unit to display at least one piece of Wi-Fi information, a short-range communication module connected to the electronic device through BLE, and a control unit to transmit wireless communication connection information for the Wi-Fi communication to the electronic device through BLE communication.

The electronic device includes a wireless communication unit to support at least one of Wi-Fi and BLE, and a control unit to receive, from the mobile terminal, wireless communication connection information for Wi-Fi communication through BLE communication and to perform Wi-FI connection based on the wireless communication connection information.

The electronic device further includes a storage unit to store the wireless communication connection information.

The electronic device is connected to a wireless communication network the same as the wireless communication network connected to the mobile terminal, based on wireless communication connection information, when the wireless communication information is stored in the storage unit.

Advantageous Effects

According to an embodiment of the present invention, the electronic device may receive wireless communication connection information from the mobile terminal and may be easily connected to the same wireless communication network as a wireless communication network to which the mobile terminal is connected.

In particular, the electronic device may be connected to the same wireless communication network as the wireless communication network to which the mobile terminal is connected through a simple process of moving the mobile terminal into the setting area or inputting the authentication number to the mobile terminal.

In addition, when the electronic device and the mobile terminal are connected to the same wireless communication network, the electronic device may be controlled through the mobile terminal. While the electronic device displays a specific image, the mobile terminal may display various pieces of information related to the image on the electronic device. Accordingly, various convenient functions may be provided without disturbing the user's viewing of the video when the user views the video.

DESCRIPTION OF DRAWINGS

FIG. 1 is a block diagram illustrating a configuration of a display device according to an embodiment of the present invention.

FIG. 2 is a block diagram illustrating a remote control device according to an embodiment of the present invention.

FIG. 3 is a view illustrating an actual configuration of a remote control device according to an embodiment of the present invention.

FIG. 4 is a view of utilizing a remote control device according to an embodiment of the present invention.

FIG. 5 is a block diagram illustrating a mobile terminal according to an embodiment of the present invention.

FIG. 6 is a flowchart illustrating a method for operating a wireless communication connection system according to an embodiment of the present invention.

FIG. 7 is a view illustrating an output of an authentication manner according to the first embodiment of the present invention.

FIG. 8 is view illustrating an output of an authentication manner according to a second embodiment of the present invention.

FIG. 9 is a view illustrating a screen for inputting authentication information according to a first embodiment of the present invention.

FIG. 10 is a view illustrating a screen for inputting authentication information input according to a second embodiment of the present invention.

FIG. 11 is a view illustrating a screen for inputting wireless communication connection information according to an embodiment of the present invention.

FIGS. 12 to 13 are views illustrating an account linking screen according to an embodiment of the present invention.

FIG. 14 is a view illustrating a control screen allowing the mobile terminal to control the electronic device according to an embodiment of the present invention.

FIG. 15 is view illustrating an EPG screen allowing the mobile terminal to control the electronic device according to an embodiment of the present invention.

FIG. 16 is a view illustrating a broadcast reservation notification screen of the electronic device according to an embodiment of the present invention.

FIG. 17 is a view illustrating a related image screen of a mobile terminal according to an embodiment of the present invention.

FIG. 18 is a view illustrating a method for displaying a mirrored image according to a first embodiment of the present invention.

FIG. 19 is a view illustrating a method for displaying a mirrored image according to a second embodiment of the present invention.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 590.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Bluetooth Low Energy (BLE), Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Then, a configuration of a mobile terminal according to an embodiment of the present invention will be described with reference to FIG. 5.

FIG. 5 is a block diagram illustrating a mobile terminal according to an embodiment of the present invention.

The mobile terminal 500 can include a wireless communication unit 510, an input unit 520, the sensing unit 540, an output unit 550, an interface unit 560, the memory 570, a control unit 580, and a power supply unit 590. In implementing a mobile terminal, components shown in FIG. 5 are not necessary, so that a mobile terminal described in this specification can include components less or more than the components listed above.

In more detail, the wireless communication unit 510 in the components can include at least one module allowing wireless communication between the mobile terminal 500 and a wireless communication system, between the mobile terminal 500 and another mobile terminal 500, or between the mobile terminal 500 and an external server. Additionally, the wireless communication unit 510 can include at least one module connecting the mobile terminal 500 to at least one network.

The wireless communication unit 510 can include at least one of a broadcast receiving module 511, a mobile communication module 512, a wireless interne module 513, a short-range communication module 514, and a location information module 515.

*121 The input unit 520 can include a camera 521 or an image input unit for image signal input, a microphone 522 or an audio input unit for receiving audio signal input, and a user input unit 523 (for example, a touch key and a mechanical key)) for receiving information from a user. Voice data or image data collected by the input unit 520 are analyzed and processed as a user's control command.

The sensing unit 540 can include at least one sensor for sensing at least one of information in a mobile terminal, environmental information around a mobile terminal, and user information. For example, the sensing unit 540 can include at least one of a proximity sensor 541, an illumination sensor 542, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification can combines information sensed by at least two or more sensors among such sensors and can then utilize it.

The output unit 550 is used to generate a visual, auditory, or haptic output and can include at least one of a display unit 551, a sound output unit 552, a haptic module 553, and an optical output unit 554. The display unit 551 can be formed with a mutual layer structure with a touch sensor or formed integrally, so that a touch screen can be implemented. Such a touch screen can serve as the user input unit 523 providing an input interface between the mobile terminal 500 and a user and an output interface between the mobile terminal 500 and a user at the same time.

The interface unit 560 can serve as a path to various kinds of external devices connected to the mobile terminal 500. The interface unit 560 can include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 560, the mobile terminal 500 can perform an appropriate control relating to the connected external device.

Additionally, the memory 570 can store data supporting various functions of the mobile terminal 500. The memory 570 can store a plurality of application programs (for example, application programs or applications) running on the mobile terminal 500 and also data and commands for operations of the mobile terminal 500. At least part of such an application program can be downloaded from an external server through a wireless communication. Additionally, at least part of such an application program can be included in the mobile terminal 500 from the time of shipment in order to perform a basic function (for example, an incoming call, a transmission function, and a message reception) of the mobile terminal 500. Moreover, an application program can be stored in the memory 570 and installed on the mobile terminal 500, so that it can run to perform an operation (or a function) of the mobile terminal 100 by the control unit 580.

The control unit 580 can control overall operations of the mobile terminal 500 generally besides an operation relating to the application program. The control unit 580 can provide appropriate information or functions to a user or process them by processing signals, data, and information inputted/outputted through the above components or executing application programs stored in the memory 570.

Additionally, in order to execute an application program stored in the memory 570, the control unit 580 can control at least part of the components shown in FIG. 5. Furthermore, in order to execute the application program, the control unit 580 can combine at least two of the components in the mobile terminal 500 and can then operate it.

The power supply unit 590 can receive external power or internal power under a control of the control unit 580 and can then supply power to each component in the mobile terminal 500. The power supply unit 590 includes a battery and the battery can be a built-in battery or a replaceable battery.

At least part of the each component can operate cooperatively in order to implement operations, controls, or control methods of a mobile terminal 100 according to various embodiments of the present invention described below. Additionally, the operations, controls, or control methods of a mobile terminal 100 can be implemented on the mobile terminal 100 by executing at least one application program stored in the memory 570.

Hereinafter, prior to examining various embodiments implemented through the mobile terminal 500, the above-listed components are described in more detail with reference to FIG. 5.

First, in describing the wireless communication unit 510, the broadcast receiving module 510 of the wireless communication unit 511 can receive a broadcast signal and/or broadcast related information from an external broadcast management server through a broadcast channel. The broadcast channel can include a satellite channel and a terrestrial channel. At least two broadcast receiving modules for simultaneous broadcast reception for at least two broadcast channels or broadcast channel switching can be provided to the mobile terminal 100.

The mobile communication module 512 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal can include various types of data according to a voice call signal, a video call signal, or text/multimedia message transmission.

The wireless internet module 513 refers to a module for wireless internet access and can be built in or external to the mobile terminal 500. The wireless internet module 513 can be configured to transmit/receive a wireless signal in a communication network according to wireless internet technologies.

The wireless internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 513 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 513 performing wireless internet access through the mobile communication network can be understood as one type of the mobile communication module 512.

The short-range communication module 514 can support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 514 can support wireless communication between the mobile terminal 500 and a wireless communication system, between the mobile terminal 500 and another mobile terminal 500, or between networks including the mobile terminal 500 and another mobile terminal 100 (or an external server) through wireless area networks. The wireless area networks can be wireless personal area networks.

Here, the other mobile terminal 500 can be a wearable device (for example, a smart watch, a smart glass, and an HMD) that is capable of exchanging data (or interworking) with the mobile terminal 500. The short-range communication module 514 can detect (or recognize) a wearable device around the mobile terminal 500, which is capable of communicating with the mobile terminal 500 Furthermore, if the detected wearable device is a device authenticated to communicate with the mobile terminal 500, the control unit 580 can transmit at least part of data processed in the mobile terminal 500 to the wearable device through the short-range communication module 514. Accordingly, a user of the wearable device can use the data processed in the mobile terminal 500 through the wearable device. For example, according thereto, if a call is received by the mobile terminal 500, a user can perform a phone call through the wearable device or if a message is received by the mobile terminal 500, a user can check the received message.

The location information module 515 is a module for obtaining the location (or the current location) of a mobile terminal and its representative examples include a global positioning system (GPS) module or a Wi-Fi module. For example, the mobile terminal can obtain its position by using a signal transmitted from a GPS satellite through the GPS module. As another example, the mobile terminal can obtain its position on the basis of information of a wireless access point (AP) transmitting/receiving a wireless signal to/from the Wi-Fi module, through the Wi-Fi module. If necessary, the position information module 115 can perform a function of another module in the wireless communication unit 510 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 520 is used for inputting image information (or signal), audio information (or signal), data, or information inputted from a user and the mobile terminal 500 can include at least one camera 521 in order for inputting image information. The camera 521 processes image frames such as a still image or a video obtained by an image sensor in a video call mode or a capturing mode. The processed image frame can be displayed on the display unit 551 or stored in the memory 570. Moreover, a plurality of cameras 521 equipped in the mobile terminal 500 can be arranged in a matrix structure and through the camera 521 having such a matrix structure, a plurality of image information having various angles or focuses can be inputted to the input terminal 500. Additionally, the plurality of cameras 521 can be arranged in a stereo structure to obtain the left and right images for implementing a three-dimensional image.

The microphone 522 processes external sound signals as electrical voice data. The processed voice data can be utilized variously according to a function (or an application program being executed) being performed in the mobile terminal 500. Moreover, various noise canceling algorithms for removing noise occurring during the reception of external sound signals can be implemented in the microphone 522.

The user input unit 523 is to receive information from a user and if information is inputted through the user input unit 523, the control unit 580 can control an operation of the mobile terminal 500 to correspond to the inputted information. The user input unit 523 can include a mechanical input means (or a mechanical key, for example, a button, a dome switch, a jog wheel, and a jog switch at the front, back or side of the mobile terminal 500) and a touch type input means. As one example, a touch type input means can include a virtual key, a soft key, or a visual key, which is displayed on a touch screen through software processing or can include a touch key disposed at a portion other than the touch screen. Moreover, the virtual key or visual key can have various forms and can be disposed on a touch screen and for example, can include graphic, text, icon, video, or a combination thereof.

Moreover, the sensing unit 540 can sense at least one of information in a mobile terminal, environmental information around a mobile terminal, and user information and can then generate a sensing signal corresponding thereto. On the basis of such a sensing signal, the control unit 580 can control the drive or control of the mobile terminal 500 or can perform data processing, functions, or operations relating to an application program installed in the mobile terminal 500. Representative sensors among various sensors included in the sensing unit 540 will be described in more detail.

First, the proximity sensor 541 refers to a sensor detecting whether there is an object approaching a predetermined detection surface or whether there is an object around by using the strength of an electromagnetic field or infrared, without mechanical contact. The proximity sensor 541 can disposed in an inner area of a mobile terminal surrounded by the touch screen or around the touch screen.

Examples of the proximity sensor 541 can include a transmission-type photoelectric sensor, a direct reflective-type photoelectric sensor, a minor reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 541 can be configured to detect the proximity of an object by changes in an electric field according to the proximity of the object having conductivity. In this case, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen if the object is proximity-touched. The proximity sensor 541 can detect a proximity touch and a proximity touch pattern (for example, a proximity touch distance, a proximity touch direction, a proximity touch speed, a proximity touch time, a proximity touch position, and a proximity touch movement state). Moreover, the control unit 580 processes data (for information) corresponding to a proximity touch operation and a proximity touch pattern, detected through the proximity sensor 541, and furthermore, can output visual information corresponding to the processed data on the touch screen. Furthermore, according to whether a touch for the same point on the touch screen is a proximity touch or a contact touch, the control unit 580 can control the mobile terminal 500 to process different operations or data (or information).

The touch sensor detects a touch (or a touch input) applied to the touch screen (or the display unit 551) by using at least one of various touch methods, for example, a resistive film method, a capacitive method, an infrared method, an ultrasonic method, and a magnetic field method.

For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured if touched, and a capacitance if touched. Here, the touch target, as an object applying a touch on the touch sensor, can be a finger, a touch pen, a stylus pen, or a pointer, for example.

In such a manner, if there is a touch input on the touch sensor, signal(s) corresponding thereto are sent to a touch controller. The touch controller processes the signal(s) and then transmits corresponding data to the control unit 580. Therefore, the control unit 580 can recognize which area of the display unit 551 is touched. Herein, the touch controller can be an additional component separated from the control unit 580 or can be the control unit 580 itself.

Moreover, the control unit 580 can perform different controls or the same control according to types of a touch target touching the touch screen (or a touch key equipped separated from the touch screen). Whether to perform different controls or the same control according to types of a touch target can be determined according to a current operation state of the mobile terminal 500 or an application program in execution.

Moreover, the above-mentioned touch sensor and proximity sensor are provided separately or combined and can thus sense various types of touches, for example, short (or tap) touch, long touch, multi touch, drag touch, flick touch, pinch-in touch, pinch-out touch, swipe touch, and hovering touch for the touch screen.

The ultrasonic sensor can recognize position information of a detection target by using ultrasonic waves. Moreover, the control unit 580 can calculate the position of a wave source through information detected by an optical sensor and a plurality of ultrasonic sensors. The position of the wave source can be calculated by using the property that light is much faster than ultrasonic wave, that is, a time that light reaches an optical signal is much shorter than a time that ultrasonic wave reaches an ultrasonic sensor. In more detail, the position of the wave source can be calculated by using a time difference with a time that ultrasonic wave reaches by using light as a reference signal.

Moreover, the camera 520 described as a configuration of the input unit 521 can include at least one of a camera sensor (for example, CCD and CMOS), a photo sensor (or an image sensor), and a laser sensor.

The camera 521 and the laser sensor can be combined to detect a touch of a detection target for a three-dimensional image. The photo sensor can be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor can calculate the coordinates of a detection target according to the amount of change in light and through this, can obtain the position information of the detection target.

The display unit 551 can display (output) information processed in the mobile terminal 500. For example, the display unit 551 can display execution screen information of an application program running on the mobile terminal 500 or user interface (UI) and graphic user interface (GUI) information according to such execution screen information.

Additionally, the display unit 551 can be configured as a three-dimensional display unit displaying a three-dimensional image.

A three-dimensional display method, for example, a stereoscopic method (a glasses method), an autostereoscopic (no glasses method), a projection method (a holographic method) can be applied to the three-dimensional display unit The sound output unit 552 can output audio data received from the wireless communication unit 510 or stored in the memory 570 in a call signal reception or call mode, a recording mode, a voice recognition mode, or a broadcast reception mode. The sound output unit 552 can output a sound signal relating to a function (for example, a call signal reception sound and a message reception sound) performed by the mobile terminal 500. The sound output unit 552 can include a receiver, a speaker, and a buzzer.

The haptic module 553 generates various haptic effects that a user can feel. A representative example of a haptic effect that the haptic module 553 generates is vibration. The intensity and pattern of vibration generated by the haptic module 553 can be controlled by a user's selection or a setting of a control unit. For example, the haptic module 553 can synthesize and output different vibrations or output different vibrations sequentially.

The haptic module 553 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 553 can be implemented to deliver a haptic effect through a direct contact and also allow a user to feel a haptic effect through a muscle sense such as a finger or an arm. The haptic module 553 can be more than two according to a configuration aspect of the mobile terminal 500.

The optical output unit 554 outputs a signal for notifying event occurrence by using light of a light source of the mobile terminal 500. An example of an event occurring in the mobile terminal 500 includes message reception, call signal reception, missed calls, alarm, schedule notification, e-mail reception, and information reception through an application.

A signal outputted from the optical output unit 554 is implemented as a mobile terminal emits single color of multi-color to the front or the back. The signal output can be terminated if a mobile terminal detects user's event confirmation.

The interface unit 560 can serve as a path to all external devices connected to the mobile terminal 500. The interface unit 560 can receive data from an external device, receive power and deliver it to each component in the mobile terminal 500, or transmit data in the mobile terminal 500 to an external device. For example, the interface unit 560 can include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 500, can include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to the terminal 100 through the interface unit 560.

Additionally, if the mobile terminal 500 is connected to an external cradle, the interface unit 560 can become a path through which power of the cradle is supplied to the mobile terminal 500 or a path through which various command signals inputted from the cradle are delivered to the mobile terminal 500 by a user. The various command signals or the power inputted from the cradle can operate as a signal for recognizing that the mobile terminal 500 is accurately mounted on the cradle.

The memory 570 can store a program for an operation of the control unit 580 and can temporarily store input/output data (for example, a phone book, a message, a still image, and a video). The memory 570 can store data on various patterns of vibrations and sounds outputted during a touch input on the touch screen.

The memory 570 can include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 500 can operate in relation to a web storage performing a storage function of the memory 570 on internet.

Moreover, as mentioned above, the control unit 580 can control operations relating to an application program and overall operations of the mobile terminal 500 in general. For example, if a state of the mobile terminal 100 satisfies set conditions, the control unit 580 can execute or release a lock state limiting an output of a control command of a user for applications.

Additionally, the control unit 580 can perform a control or processing relating to a voice call, data communication, and a video call can perform pattern recognition processing for recognizing handwriting input or drawing input on the touch screen as a text and an image, respectively. Furthermore, the control unit 580 can use at least one or a combination of the above components to perform a control in order to implement various embodiments described below on the mobile terminal 500.

The power supply unit 590 can receive external power or internal power under a control of the control unit 580 and can then supply power necessary for an operation of each component. The power supply unit 590 includes a battery. The battery is a rechargeable built-in battery and can be detachably coupled to a terminal body in order for charging.

Additionally, the power supply unit 590 can include a connection port and the connection port can be configured as one example of the interface unit 160 to which an external charger supplying power for charging of the battery is electrically connected.

As another example, the power supply unit 590 can be configured to charge a battery through a wireless method without using the connection port. In this case, the power supply unit 590 can receive power from an external wireless power transmission device through at least one of an inductive coupling method based on a magnetic induction phenomenon, and a magnetic resonance coupling method based on an electromagnetic resonance phenomenon.

Moreover, various embodiments below can be implemented in a computer or device similar thereto readable medium by using software, hardware, or a combination thereof.

Then, a communication system using the mobile terminal 500 is described according to an embodiment of the present invention.

First, the communication system can use different wireless interfaces and/or physical layers. For example, a wireless interface available to the communication system can include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system can include at least one terminal 100, at least one base station (BS) (it can be referred to as Node B or Evolved Node B), at least one base station controllers (BSCs), and a mobile switching center (MSC). MSC can be configured to be connected to Public Switched Telephone Network (PSTN) and BSCs. BSCs can be connected being paired with a BS through a backhaul line. The backhaul line can be provided according to at least one of E1/T1, ATM, IP, PPP, Frame Relay, HDSL, ADSL, and xDSL. Accordingly, a plurality of BSCs can be included in a CDMA wireless communication system.

Each of a plurality of BSs can include at least one sensor and each sensor can include an omni-directional antenna or an antenna indicating a specific radial direction from a BS. Additionally, each sensor can include at least two antennas in various forms. Each BS can be configured to support a plurality of frequency allocations and each of the plurality of frequency allocations can have a specific spectrum (for example, 1.25 MHz, 5 MHz, and so on).

The intersection of a sector and a frequency allocation can be referred to as a CDMA channel. A BS can be referred to as a Base Station Transceiver Subsystem (BTS). In such a case, one BSC and at least one BS together can be referred to as "BS". A BS can also represent "cell site". Additionally, each of a plurality of sectors for a specific BS can be referred to as a plurality of cell sites.

A Broadcasting Transmitter (BT) transmits broadcast signals to the terminals 100 operating in a system. The broadcast reception module 511 shown in FIG. 5 is provided in the terminal 100 for receiving broadcast signals transmitted from the BT.

Additionally, GPS can be linked to a CDMA wireless communication system in order to check the location of the mobile terminal 500. Then, a satellite helps obtaining the location of the mobile terminal 500. Useful location information can be obtained by at least one satellite. Herein, the location of the mobile terminal 500 can be traced by using all techniques for tracing the location in addition to GPS tracking technique. Additionally, at least one GPS satellite can be responsible for satellite DMB transmission selectively or additionally.

The location information module 515 in a mobile terminal is for detecting and calculating the position of the mobile terminal and its representative example can include a GPS module and a WiFi module. If necessary, the position information module 115 can perform a function of another module in the wireless communication unit 510 in order to obtain data on the location of the mobile terminal substitutionally or additionally.

The GPS module 115 can calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 can speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) can be utilized.

WPS is a technique for tracking the location of the mobile terminal 500 by using a WiFi module in the mobile terminal 500 and a wireless Access Point (AP) for transmitting or receiving wireless signals to or from the WiFi module and can mean a Wireless Local Area Network (WLAN) based location measurement technique using WiFi.

A WiFi location tracking system can include a WiFi location measurement server, a mobile terminal 500, a wireless AP connected to the mobile terminal 500, and a database for storing arbitrary wireless AP information.

The mobile terminal 500 in access to a wireless AP can transmit a location information request message to a WiFi location measurement server.

The WiFi location measurement server extracts information of a wireless AP connected to the mobile terminal 500 on the basis of a location information request message (or signal) of the mobile terminal 500. Information of a wireless AP connected to the mobile terminal 500 can be transmitted to the WiFi location measurement server through the mobile terminal 500 or can be transmitted from a wireless AP to a WiFi location measurement server.

Based on the location information request message of the mobile terminal 500, the extracted information of a wireless AP can be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server can extract wireless AP information corresponding to a wireless AP that the mobile terminal 500 access from a pre-established database by using information of the wireless AP connected to the mobile terminal 100. At this point, information of arbitrary wireless APs stored in the database can information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server can extract only a predetermined number of wireless AP information in high RS SI order.

Then, the WiFi location measurement server can extract (or analyze) the location information of the mobile terminal 500 by using at least one wireless AP information extracted from the database. By comparing the included information and the received wireless AP information, location information of the mobile terminal 500 is extracted (or analyzed).

As a method of extracting (or analyzing) the location information of the motile terminal 500, a Cell-ID method, a finger-print method, a triangulation method, and a landmark method can be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but if the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) can be used.

The landmark method is a method for measuring the location of a mobile terminal by using a landmark transmitter knowing the location.

In addition to the listed methods, a variety of algorithms can be utilized as methods for extracting (or analyzing) the location information of a mobile terminal.

As the extracted location information of the mobile terminal 500 is transmitted to the mobile terminal 500 through the WiFi location measurement server, the mobile terminal 500 can obtain the location information.

As connected to at least one wireless AP, the mobile terminal 500 can obtain location information. At this point, the number of wireless APs, which are required for obtaining the location information of the mobile terminal 500, can vary according to a wireless communication environment where the mobile terminal 500 is located.

A wireless communication connection system according to an embodiment of the present invention may include a mobile terminal and an electronic device.

A mobile terminal may be a mobile device such as a smart phone, but this is provided only for the illustrative purpose. Hereinafter, it is assumed that the mobile terminal is the mobile terminal 500 described with reference to FIG. 5. For convenience of explanation, the mobile terminal is provided only for the illustrative purpose, and the mobile terminal may include all the electronic devices which are connected to a wireless access device by wireless communication and may transmit the information on the wireless communication to another device.

In this case, the wireless access device may refer to an access point (AP) that is a device for connecting a wired LAN to a wireless LAN. The wireless access device may be a router.

Hereinafter, a wireless communication network may refer to a short-range wireless communication network supporting Wi-Fi communication with a device connected to the wireless access device within a certain distance.

The electronic device may be a display device described with reference to FIGS. 1 to 4, but this is provided for the illustrative purpose. Hereinafter, it is assumed that the electronic device is the display device 100 described with reference to FIGS. 1 to 4. However, this is provided for the illustrative purpose for convenience of explanation, and the electronic device is not limited to a home appliance, such as a refrigerator, a watching machine, or an air conditioner, mounted at home.

FIG. 6 is a flowchart illustrating a method for operating a wireless communication connection system according to an embodiment of the present invention.

The mobile terminal 500 may be connected to a wireless communication network together with a wireless access device 300 (S11).

The mobile terminal 500 may be connected to a wireless communication network provided by the wireless access device 300. In this case, the wireless communication network provided by the wireless access device 300 may refer to a wireless fidelity communication network.

In other words, the mobile terminal 500 may perform a wireless fidelity connection.

The mobile terminal 500 may sense a wireless communication network provided by each of a plurality of wireless connection devices 300 or may select any one of the wireless connection devices 300 to be connected to a wireless communication network.

The electronic device 100 may determine whether there is stored wireless communication connection information (S13).

The wireless communication connection information may include access information for connection to the wireless communication network, and may include an identifier (ID), a password, an IP address, and the like for identifying the wireless communication network. For example, the wireless communication connection information may include a Wi-Fi name, a Wi-Fi password, and a Wi-Fi address.

The electronic device 100 may store wireless communication connection information for access to a wireless communication network. Meanwhile, the electronic device 100 may delete the stored wireless communication connection information.

Therefore, when the electronic device 100 is first connected to the wireless communication network, the wireless communication connection information may not be stored. When the electronic device 100 is connected to the wireless communication network two times or more, the wireless communication connection information may be stored or not stored.

The electronic device 100 may receive a wireless communication connection request through the user input interface unit 150 and may determine whether there is present the stored wireless communication connection information, when receiving the wireless communication connection request.

The control unit 170 of the electronic device 100 may be connected to the wireless access device 300 based on the stored wireless communication connection information when there is present the stored wireless communication connection information.

Meanwhile, the control unit 170 of the electronic device 100 may perform wireless communication network connection using the mobile terminal 500 when there is absent the stored wireless communication connection information.

In this case, the wireless communication network connect using the mobile terminal 500 may refer to wireless communication network connection through a Wi-Fi Alliance Device Provisioning Protocol (WFA DPP), and the wireless communication network connection through the WFA DPP will be described in detail below in step S15 to step S27 of FIG. 6.

Meanwhile, although FIG. 6 illustrates that the wireless communication network connection using the mobile terminal 500 is directly performed when there is no the stored wireless communication connection information, according to an embodiment, the control unit 170 of the electronic device 100 may receive the selection for whether the wireless communication network connection using the mobile terminal 500 is performed when there is absent the stored wireless communication connection information.

In detail, the control unit 170 of the electronic device 100 may display a screen for selecting a wireless communication network connection manner when there is absent the stored wireless communication connection information. The control unit 170 performs step S15 to step S27 of FIG. 6 when a wireless communication network connection manner using the mobile terminal 500 is selected. When a wireless communication network connection manner without using the mobile terminal 500 is selected, the electronic device 100 may directly detect radio waves and may be connected to the wireless access device 300.

Hereinafter, the wireless communication network connection manner using the mobile terminal 500 will be described in detail.

The control unit 170 of the electronic device 100 may perform a BLE connection with the mobile terminal 500 (S14).

The control unit 170 of the electronic device 100 transmits a connection request signal to at least one device located in an adjacent area, and when one of devices receiving the connection request signal transmits a connection accept signal, the Bluetooth Low Energy (BLE) connection may be established between the electronic device 100 and any one of the devices. Any one of the devices may be the mobile terminal 500.

In other words, as the electronic device 100 operates in a BLE advertise mode and the mobile terminal 500 operates in a BLE scan mode, the electronic device 100 and the mobile terminal 500 may make the BLE connection.

The control unit 170 of the electronic device 100 may output an authentication manner after the BLE connection (S15).

According to the first embodiment, the control unit 170 may output an authentication manner for moving the mobile terminal 500 to the setting area.

FIG. 7 is a view illustrating an output of an authentication manner according to the first embodiment of the present invention.

The display unit 180 may display a sensing authentication manner 710 and a cancel icon 720. The sensing authentication manner 710 may include an image 701 for indicating a setting area, and a message 702 for moving the mobile terminal 500 to the set area.

When receiving a command for selecting the cancel icon 720, the control unit 170 may cancel the authentication with the mobile terminal 500 through sensing.

According to a second embodiment, the control unit 170 may output an authentication manner for inputting a setting number through the mobile terminal 500.

FIG. 8 is view illustrating an output of an authentication manner according to a second embodiment of the present invention.

The display unit 180 may display a number authentication manner 810 and a cancel icon 820. The number authentication manner 810 may include an image 801 for indicating a setting number and a message 802 for inputting the setting number to the mobile terminal 500. In this case, the setting number may be changed whenever the number authentication manner 810 is displayed.

When receiving a command for selecting the cancel icon 820, the control unit 170 may cancel the authentication with the mobile terminal 500 through the number.

According to a third embodiment, the control unit 170 may output the authentication manner of moving the mobile terminal 500 to the setting area or of inputting the setting number through the mobile terminal 500.

In this case, the display unit 180 may simultaneously display the sensing authentication manner 710 and the number authentication manner 810.

Meanwhile, the control unit 580 of the mobile terminal 500 may display an input screen of authentication information (S17).

The display unit 551 of the mobile terminal 500 may display an input screen of authentication information.

Based on the input screen of the authentication information, the mobile terminal 500 may be moved to the setting area or may receive the input of the authentication number.

The control unit 580 of the mobile terminal 500 may transmit the input authentication number to the electronic device 100 when the authentication number is input.

The mobile terminal 500 displaying the input screen of the authentication information may be a device to be BLE-connected to the electronic device 100.

The control unit 580 of the mobile terminal 500 may display a screen for inputting authentication information different depending on the authentication manner output by the electronic device 100.

For example, when the electronic device 100 outputs the sensing authentication manner 710 as illustrated in FIG. 7, the control unit 580 of the mobile terminal 500 displays a screen for inputting the sensing authentication information, 100 outputs the number authentication manner 810 as illustrated in FIG. 8, the control unit 580 of the mobile terminal 500 may display the input screen of the number authentication information.

FIG. 9 is a view illustrating a screen for inputting authentication information according to a first embodiment of the present invention.

According to the first embodiment of the present invention, the display unit 551 of the mobile terminal 500 may display a screen for inputting authentication information for sensing. The screen for inputting the authentication information for sensing may include step information 901 and a movement command message 910.

The step information 901 may indicate a position of a current step among a plurality of steps when the process for the wireless communication network connection using the mobile terminal 500 is divided into a plurality of steps. The step information 901 on the screen for inputting the authentication information may indicate one step.

The move command message 910 may include a command for moving the mobile terminal 500 to the setting area.

FIG. 10 is a view illustrating a screen for inputting authentication information input according to a second embodiment of the present invention.

The display unit 551 of the mobile terminal 500 may display a screen for inputting the number authentication information.

According to the second embodiment of the present invention, the display unit 551 of the mobile terminal 500 may display the screen for inputting number authentication information. The screen for inputting the number authentication information may display at least one of the step information 901, an input number information 1010, and a number key 1020.

The step information 901 may indicate a position of a current step among a plurality of steps when the process of the wireless communication network connection using the mobile terminal 500 is divided into a plurality of steps. The step information 901 on the screen for inputting the authentication information may indicate one step.

The input number information 1010 may display a number, which is being input, or the number which has already input. The input number information 1010 may further include a number input command message for inputting the number displayed on the electronic device 100.

The number key 1020 may include a key button for receiving a number. According to an embodiment, the number key 1020 is omitted from the screen for inputting the authentication information, and the number may be input through a separate physical key provided in the mobile terminal 500.

Hereinafter, the description will be made again with reference to FIG. 6.

The control unit 170 of the electronic device 100 may determine whether the input authentication information is matched with output information of the electronic device (S19).

In other words, the control unit 580 of the mobile terminal 500 may determine whether the input authentication information is matched with the output information of the electronic device.

According to the first embodiment, the control unit 170 of the electronic device 100 may sense the mobile terminal 500 in the setting area and determine whether the input authentication information is matched with the output information of the electronic device have.

In other words, the control unit 170 senses the BLE-connected mobile terminal 500 in the setting area and determines that the input authentication information is matched with the output information of the electronic device when the mobile terminal 500 is sensed. When the mobile terminal 500 is not sensed, the control unit 170 may determine that the input authentication information is not matched with the output information of the electronic device.

According to the second embodiment, the control unit 170 of the electronic device 100 may determine whether the setting number displayed by the electronic device 100 is matched with the number input by the mobile terminal 500.

The control unit 170 of the electronic device 100 may receive the input number from the mobile terminal 500.

The control unit 170 determines that the input authentication information is matched with the output information of the electronic device when the setting number displayed at the time of outputting the authentication manner is matched with the received input number. When the setting number displayed at the time of outputting the authentication manner is not matched with the received input numbers, the control unit 170 determines that the input authentication information is not matched with the output information of the electronic device.

When the setting number displayed at the time of outputting the authentication manner is not matched with the received input numbers, the control unit 170 of the electronic device 100 continuously outputs the authentication manner, and the mobile terminal 500 may continuously display the screen for inputting the authentication information.

Meanwhile, according to the embodiment, when the input authentication information is not matched with the output information of the electronic device, the control unit 170 of the electronic device 100 may output a message to re-input the authentication information.

The control unit 170 of the electronic device 100 may complete the authentication when the input authentication information is matched with the output information of the electronic device.

The control unit 170 of the electronic device 100 may transmit an authentication completion signal to the mobile terminal 500 when the authentication is completed (S20).

When the authentication is completed, the control unit 580 of the mobile terminal 500 may receive the input of the wireless communication connection information (S21) and may transmit the wireless communication connection information to the electronic device 100 (S23).

According to the first embodiment, the control unit 580 of the mobile terminal 500 may transmit, to the electronic device 100, the wireless communication connection information of the wireless communication network currently connected to the electronic device 100 when the authentication is completed.

According to the second embodiment, the control unit 580 of the mobile terminal 500 may receive the input of the wireless communication connection information with the electronic device 100 when the authentication is completed and may transmit the input wireless communication connection information to the electronic device 100.

FIG. 11 is a view illustrating a screen for inputting wireless communication connection information according to an embodiment of the present invention.

The control unit 580 of the mobile terminal 500 may display the screen for inputting wireless communication connection information when the authentication is completed.

The screen for inputting the wireless communication connection information includes the step information 901, current wireless communication network information 1110, an icon 1120 for changing a wireless communication network, a cancel icon 1131, and a confirmation icon 1132.

The step information 901 on the screen for inputting authentication information may indicate two steps.

The current wireless communication network information 1110 may include an ID and a password of a wireless communication network with which the mobile terminal 500 is currently connected. The current wireless communication network information 1110 may be information on a wireless communication network to which the electronic device 100 is to be connected.

The control unit 580 may transmit, to the electronic device 100, wireless communication connection information on the wireless communication network included in the current wireless communication network information 1110.

The icon 1120 for changing the wireless communication network may be an icon for changing the wireless communication network with which the mobile terminal 500 is currently connected. When receiving the command for selecting the icon 1120 for changing the wireless communication network, the control unit 580 may display a change screen (not illustrated) for changing the currently-connected wireless communication network to another wireless communication network, and the change screen may include a list indicating wireless communication network information.

The control unit 580 may change wireless communication network information indicated by the current wireless communication network information 1110, when changing the wireless communication network connected through the icon 1120 for changing the wireless communication network.

When changing the wireless communication network information indicated by the current wireless communication network information 1110, the control unit 580 may change the wireless communication connection information transmitted to the electronic device 100.

The cancel icon 1131 may be an icon for canceling the input of the wireless communication connection information. The control unit 580 may not transmit the wireless communication connection information to the electronic device 100 when receiving the command for selecting the cancel icon 1131.

The confirmation icon 1132 may be an icon for completing the input of wireless communication connection information. The control unit 580 may transmit, to the electronic device 100, the wireless communication connection information based on the current wireless communication network information 1110 when receiving the command for selecting the confirmation icon 1132. The wireless communication connection information based on the current wireless communication network information 1110 may be wireless communication connection information based on the wireless communication network to which the mobile terminal 500 is currently connected.

The control unit 170 may store the wireless communication connection information in the storage unit 140 (S25).

The control unit 170 of the electronic device 100 may receive the wireless communication connection information from the mobile terminal 500 and store the received wireless communication connection information in the storage unit 140.

The control unit 170 of the electronic device 100 may establish a wireless communication connection with the wireless access device 300 based on the stored wireless communication connection information (S27).

The control unit 170 of the electronic device 100 may be connected to the same wireless communication network as the wireless communication network with which the mobile terminal 500 is connected. The control unit 170 is connected to the wireless access device 300 with which the mobile terminal 500 is connected and may make Wi-Fi communication.

The control unit 170 of the electronic device 100 may be connected to the wireless communication network based on the wireless communication connection information received from the mobile terminal 500.

Meanwhile, according to the embodiment, the control unit 170 of the electronic device 100 may receive the information on an account from the mobile terminal 500 and may link the account.

The display unit 551 of the mobile terminal 500 may display an account linking screen (S31).

The control unit 580 of the mobile terminal 500 may receive a command for linking an account through the accounting linking screen.

The control unit 580 of the mobile terminal 500 may determine whether to receive the command for linking the account (S33).

When receiving the command for linking the account, the control unit 580 transmits the account information to the electronic device 100 (S35), and the control unit 170 of the electronic device 100 may set up account linking (S37).

Meanwhile, if the control unit 580 does not receive the command for linking the account, the control unit 580 may cancel the account linking (S39).

When the control unit 170 of the electronic device 100 sets up the account linking with the mobile terminal 500, the account information changed in the electronic device 100 may be identically applied to the mobile terminal 500. The account information changed in the mobile terminal 500 may be applied to the electronic device.

FIGS. 12 to 13 are views illustrating an account linking screen according to an embodiment of the present invention.

The display unit 551 of the mobile terminal 500 may display an account linking screen and the account linking screen may include step information 901, account linking guide information 1310, input account information 1320, a skip icon 1331, and a linking icon 1332.

The step information 901 on the account linking screen may indicate three steps.

The account liking guide information 1310 may include at least one of an account liking manner, an account linking function, and a method of the account linking.

The input account information 1320 may display account information, which is being input, or account information that has been already input. The account information may include the ID of a user. According to an embodiment, the account information may further include the password of the user.

The skip icon 1331 may be an icon that skips the account linking step. When the control unit 580 of the mobile terminal 500 receives the command for selecting the skip icon 1331, the account linking may not be set up.

The linking icon 1332 may be an icon for setting up the account linking. When receiving the command for selecting the linking icon 1332, the control unit 580 of the mobile terminal 500 transmits the account information indicated by the input account information 1320 to the electronic device 100 and may link to the electronic device 100 through the account.

The display unit 551 of the mobile terminal 500 may display account information transmission information 1210 while transmitting the account information to the electronic device 100. The account information transmission information 1210 may include a message for informing that the mobile terminal 500 is transmitting the account information to the electronic device 100.

The control unit 170 of the electronic device 100 may receive the account information from the mobile terminal 500 and may register the received account information to link to the mobile terminal 500.

When the control unit 170 of the electronic device 100 receives the account information of the mobile terminal 500 to link to the mobile terminal 500, the mobile terminal 500 may control Internet of things (IoT) devices registered in the account information through the electronic device 100.

Hereinafter, a method for operating the mobile terminal 500 and the electronic device 100 connected to the same wireless communication network through the WFA DPP will be described with reference to FIGS. 14 to 19. Referring to FIGS. 14 to 19, the mobile terminal 500 may control the electronic device 100.

FIG. 14 is a view illustrating a control screen allowing the mobile terminal to control the electronic device according to an embodiment of the present invention.

The display unit 551 of the mobile terminal 500 may display a control screen. The control screen, which is a screen for controlling the electronic device 100, may include at least one of a power icon 1401, an external input icon 1402, a setting icon 1403, a volume icon 1404, a channel icon 1405, a mute icon 1406, an EPG icon 1407, a home icon 1408, and a related video icon 1409.

The power icon 1401 may be an icon for turning on or off the power of the electronic device 100.

The control unit 580 of the mobile terminal 500 may recognize a power-on command when receiving a command for selecting the power icon 1401 when the electronic device 100 is powered off and in a standby state. The control unit 580 may transmit a power-on control signal through the BLE when receiving the power-on command. The case of transmitting the power-on signal is the case that the electronic device 100 is powered off and the state that the connection to the wireless communication network is released. Accordingly, the control unit 580 may transmit the power-on signal through the BLE.

Meanwhile, the control unit 580 of the mobile terminal 500 may recognize the command for selecting the power icon 1401 as a power-off command when receiving the command for selecting the power icon 1401 in the state that the electronic device 100 is powered on. When receiving the power-off command, the control unit 580 may transmit a power-off signal to the electronic device 100 through WiFi over the wireless communication network. The case that the power-off signal is transmitted is the case that the electronic device 100 is powered on and connected to the wireless communication network. Accordingly, the power-off signal may be transmitted through the WiFi.

Similarly, when a control signal is transmitted to the electronic device 100 through an external input icon 1402, a setting icon 1403, a volume icon 1404, a channel icon 1405, a mute icon 1406, an EPG icon 1407, a home icon 1408 or the related image icon 1409, the control signal may be transmitted to the electronic device 100 through the WiF over the wireless communication network.

The external input icon 1402 may be an icon for searching for an external input signal connected to the electronic device 100.

The setting icon 1403 may be an icon for setting screen information such as the brightness, saturation, and ratio of the electronic device 100.

The volume icon 1404 may be an icon for adjusting the size of the sound output from the electronic device 100.

The channel icon 1405 may be an icon for controlling an image channel displayed by the electronic device 100.

The mute icon 1406 may be an icon for adjusting the sound output from the electronic device 100 to zero.

The related image icon 1409 may be an icon for searching for an image related to the image currently displayed on the electronic device 100.

The control unit 580 of the mobile terminal 500 may receive a command for selecting at least one icon 1401 to 1409 displayed on the control screen and may control the mobile terminal 500 or the electronic device 100 depending on the selected icon.

FIG. 15 is view illustrating an EPG screen allowing the mobile terminal to control the electronic device according to an embodiment of the present invention.

The control unit 580 of the mobile terminal 500 may receive a command for selecting an EPG icon 1407 on the control screen. When the command for selecting the EPG icon 1407 is received, the control unit 580 may display the EPG screen 1510 as illustrated in FIG. 15.

The EPG screen 1510 may display TV show information currently being broadcasted and TV show information scheduled to be broadcasted from the current time according to channels. In other words, the EPG screen 1510 may display an electronic program guide.

As described above, when the control unit 580 of the mobile terminal 500 receives the command for selecting the EPG icon 1407, the EPG screen is not output to the electronic device 100 but on the display unit 551 of the mobile terminal 500. In this case, the user has the advantage that the EPG may be confirmed through the mobile terminal 500 while continuously watching a video being viewed through the electronic device 100 without being interrupted.

In addition, the control unit 580 of the mobile terminal 500 may receive a broadcast reservation command on the EPG screen 1510. For example, the control unit 580 may display a reservation icon (not illustrated) when receiving a command for selecting any one TV show displayed on the EPG screen 1510, and when receiving a command for selecting the reservation icon (not illustrated), the control unit 580 of the mobile terminal may recognize the reservation icon as a broadcast reservation command for the selected TV show.

The control unit 580 of the mobile terminal 500 may transmit broadcast reservation information to the electronic device 100 when the broadcast reservation command is recognized. The electronic device 100 may display a broadcast reservation notification at a time to broadcast the selected TV show depending on the broadcast reservation information.

FIG. 16 is a view illustrating a broadcast reservation notification screen of the electronic device according to an embodiment of the present invention.

The display unit 180 of the electronic device 100 may display a broadcast reservation notification screen 1610.

The broadcast reservation notification screen 1610 may include broadcast reservation information received from the mobile terminal 500, a cancel icon 1621, and a viewing changing icon 1622. For example, the broadcast reservation information may include at least one of a TV show name, a broadcast time, a channel number, and a broadcast station name.

The cancel icon 1621 may be an icon for canceling broadcast viewing according to broadcast reservation information. When the control unit 180 of the electronic device 100 receives a command for selecting the cancel icon 1621, the control unit 180 of the electronic device 100 may maintain the currently displayed channel.

The viewing changing icon 1622 may be an icon for changing a channel to allow a user to view a broadcast based on the broadcast reservation information. When receiving a command for selecting the viewing changing icon 1622, the control unit 180 may change the channel based on the broadcast reservation information.

FIG. 17 is a view illustrating a related image screen of a mobile terminal according to an embodiment of the present invention.

In the control screen as illustrated in FIG. 14, the control unit 580 of the mobile terminal 500 may receive a command for selecting the related image icon 1409. When receiving the command for selecting the related image icon 1409, the control unit 580 may display the related image screen 1710 on the display unit 551 as illustrated in FIG. 17 on the display unit 551.

The related image screen 1710 may include an image related to the image currently being displayed by the electronic device 100.

In other words, when receiving the command for selecting the related image icon 1409, the control unit 580 of the mobile terminal 500 displays the image, which is related to the image currently being displayed by the electronic device 100, on the display unit 551 may be. For example, the image related to the currently being displayed image may include a partial image of the currently being displayed image, an image in which the actor in the currently displayed image appears, and the like.

As described above, the control unit 580 of the mobile terminal 500 may display the image related to the image being displayed by the electronic device 100 on the display unit 551 of the mobile terminal 500. In this case, the related image may be informed to the user through the mobile terminal 500 without interfering with the user's viewing of the image through the electronic device 100.

FIG. 18 is a view illustrating a method for displaying a mirrored image according to a first embodiment of the present invention, and FIG. 19 is a view illustrating a method for displaying a mirrored image according to a second embodiment of the present invention.

Referring to FIG. 18, the control unit 580 of the mobile terminal 500 may receive a mirroring command. The mirroring command may refer to a command for displaying a screen of the mobile terminal 500 on a screen of the electronic device 100.

The control unit 580 of the mobile terminal 500 may receive a mirroring command through voice recognition or through a command for selecting the mirroring icon (not illustrated) on the display 551.

When the mobile terminal 500 receives the mirroring command in the state that the mobile terminal 500 and the electronic device 100 are connected to the same wireless access device 300 through the WFA DDP, the display unit 180 of the electronic device 100 may display the mirrored image. The control unit 170 of the electronic device 100 may receive screen information from the mobile terminal 500 and display the mirrored image.

As illustrated in FIG. 18, the mirrored image may be an image displayed as a mobile terminal screen 1802 overlaps with an electronic device screen 1801. However, this is provided only for the illustrative purpose, and the mirrored image may be an image displaying only the mobile terminal screen 1802.

Since the mobile terminal 500 and the electronic device 100 are connected to the same wireless access device 300 through the WFA DDP, the mirrored image may be received through the electronic device 100 or the remote control device 200 instead of the mobile terminal 500.

For example, as illustrated in FIG. 19, the remote control device 200 may receive the mirroring command. The remote control device 200 may receive the mirroring command through voice recognition or through a selection command of a button (not illustrated) provided in the remote control device 200.

The remote control device 200 may transmit the received mirroring command to the electronic device 100 and the electronic device 100 may receive the screen information from the mobile terminal 500 and display the mirrored image.

As described above, when the mobile terminal 500 and the electronic device 100 are connected to the same wireless access device 300 through the WFA DDP, the mirroring command may be easily received through the electronic device 100 or the remote control device 200 as well as the mobile terminal 500 such that the electronic device 100 is able to display the mirrored image. In other words, a user may simplify the procedure of displaying the mirrored image of the mobile terminal 500 in the electronic device 100.

The description above is merely illustrative of the technical idea of the present invention, and various changes and modifications may be made by those skilled in the art without departing from the essential characteristics of the present invention.

Therefore, the embodiments disclosed in the present invention are intended to illustrate rather than limit the scope of the present invention, and the scope of the technical idea of the present invention is not limited by these embodiments.

The scope of protection of the present invention should be construed according to the following claims, and all technical ideas within the scope of equivalents should be construed as being included in the scope of the present invention.

What is claimed is:

1. A display device for connecting to a wireless communication network, the display device comprising:
a display;
one or more wireless communication modules; and
a controller configured to:
determine whether wireless communication connection information of the wireless communication network is stored;
connect a mobile terminal through a Bluetooth Low Energy (BLE) with the one or more wireless communication modules based on the wireless communication connection information of the wireless communication network not being stored;
determine whether the mobile terminal is connected to the wireless communication network;
display, via the display, an authentication manner for authenticating the mobile terminal using Bluetooth Low Energy (BLE) based on the mobile terminal being connected to the wireless communication network, wherein displaying the authentication manner comprises displaying an image indicating a physical placement where the mobile terminal is to be positioned with respect to the display device in order to authenticate the mobile terminal;
sense, via the one or more wireless communication modules, a positioning of the mobile terminal being matched to the indicated physical placement displayed on the display to authenticate the mobile terminal;
receive from the mobile terminal, via BLE, wireless communication connection information including an access information for an access point (AP) of the wireless communication network after authenticating the mobile terminal;
store the wireless communication connection information including the access information of the wireless communication network in a memory;
establish, via the one or more wireless communication modules, a wireless communication connection to the wireless communication network based on the access information of the received wireless communication connection information or the stored wireless communication connection information;
receive, from the mobile terminal, account information for linking an account of the display device with an account of the mobile terminal;
register the received account information to link to the mobile terminal; and
receive, via the established wireless communication connection, a command from the mobile terminal to control the display device.

2. The display device of claim 1, wherein the controller is configured to perform, via the one or more wireless communication modules, wireless communication with the mobile terminal through a Bluetooth Low Energy (BLE) connection before establishing the connection to the wireless communication network, and perform, via the one or more wireless communication modules, wireless communication with the mobile terminal through a Wi-Fi connection after establishing the connection to the wireless communication network.

3. The display device of claim 1, wherein the controller is configured to perform, via the one or more wireless communication modules, wireless communication with the mobile terminal through a Bluetooth Low Energy (BLE) connection when the mobile terminal is in a power-off standby state.

4. The display device of claim 1, wherein controller is further configured to receive, from the mobile terminal, wireless communication connection information according to another wireless communication network based on the mobile terminal receiving a command for changing the wireless communication network to the another wireless communication network.

5. The display device of claim 1, wherein the controller is further configured to display, via the display, a video while an electronic program guide (EPG) is displayed at the mobile terminal in response to a command for displaying the EPG.

6. The display device of claim 5, wherein the controller is further configured to display, via the display, a broadcast reservation notification screen based on a broadcast reservation command received via the EPG at the mobile terminal.

7. The display device of claim 1, wherein the controller is further configured to display, via the display, a video, and wherein a related video is displayed at the mobile terminal in response to a command for displaying the related video received at the mobile terminal.

8. The display device of claim 1, wherein the controller is further configured to display, via the display, a mirrored image of a screen of the mobile terminal in response to a mirroring command received via a remote control.

9. The display device of claim 1, wherein:
the one or more wireless communication units supports Wi-Fi and Bluetooth Low Energy (BLE);
the wireless communication connection information is received through a BLE communication; and
the wireless communication connection is established through a Wi-FI communication.

10. The display device of claim 1, wherein the controller is further configured to establish connection to the wireless communication network based on wireless communication connection information stored in the memory for a next connection occasion without receiving wireless communication connection information from the mobile terminal.

11. The display device of claim 1, wherein the wireless communication connection information includes at least one of an identifier(ID), a password, an IP address, a Wi-Fi name, a Wi-Fi password, and a Wi-Fi address.

12. The display device of claim 1, wherein the controller is further configured to;
control, via the wireless communication network, registered internet of things(IoT) based on the account information of the mobile terminal.

13. A method of connecting a display device to a wireless communication, the method comprising:
determining whether wireless communication connection information of a wireless communication network is stored;
connecting a mobile terminal through a Bluetooth Low Energy (BLE) with one or more wireless communication modules based on the wireless communication connection information of the wireless communication network not being stored;
determining whether the mobile terminal is connected to the wireless communication network;
displaying, via a display, an authentication manner for authenticating the mobile terminal based on the mobile terminal being connected to the wireless communication network, wherein displaying the authentication manner comprises displaying an image indicating a physical placement where the mobile terminal is to be positioned with respect to the display device in order to authenticate the mobile terminal;
sensing, via the one or more wireless communication modules, a positioning of the mobile terminal being matched to the indicated physical placement displayed on the display to authenticate the mobile terminal;
receiving from the mobile terminal, through Bluetooth Low Energy (BLE), wireless communication connection information including an access information for an access point (AP) of the wireless communication network after authenticating the mobile terminal;
storing the wireless communication connection information including the access information of the wireless communication network in a memory;
establishing, via the one or more wireless communication modules, a wireless communication connection to the wireless communication network based on the access information of the received wireless communication connection information or the stored wireless communication connection information;
receiving, from the mobile terminal, account information for linking an account of the display device with an account of the mobile terminal;
registering the received account information to link to the mobile terminal; and
receiving, via the established wireless communication connection, a command from the mobile terminal to control the display device.

14. The method of claim 13, further comprising establishing connection to the wireless communication network based on the wireless communication connection information stored in the memory for a next connection occasion without receiving wireless communication connection information from the mobile terminal.

* * * * *